US011389841B2

(12) United States Patent
Morrison

(10) Patent No.: US 11,389,841 B2
(45) Date of Patent: Jul. 19, 2022

(54) SYSTEM AND METHOD FOR INFRASTRUCTURE AND ASSET MANAGEMENT

(71) Applicant: Main Stream, LLC, West Lafayette, IN (US)

(72) Inventor: Don Morrison, West Lafayette, IN (US)

(*) Notice: Subject to any disclaimer, the term of this patent is extended or adjusted under 35 U.S.C. 154(b) by 28 days.

(21) Appl. No.: 16/507,877

(22) Filed: Jul. 10, 2019

(65) Prior Publication Data
US 2020/0018445 A1 Jan. 16, 2020

Related U.S. Application Data

(60) Provisional application No. 62/696,050, filed on Jul. 10, 2018.

(51) Int. Cl.
| | |
|---|---|
| B08B 9/032 | (2006.01) |
| F17D 5/00 | (2006.01) |
| G06Q 10/00 | (2012.01) |
| G01F 15/063 | (2022.01) |
| F17D 3/01 | (2006.01) |
| G01F 25/00 | (2022.01) |
| E03B 7/00 | (2006.01) |
| G01F 1/84 | (2006.01) |
| E03B 7/04 | (2006.01) |
| E03B 7/07 | (2006.01) |
| F16L 55/24 | (2006.01) |

(Continued)

(52) U.S. Cl.
CPC ............ *B08B 9/0321* (2013.01); *E03B 7/006* (2013.01); *E03B 7/04* (2013.01); *E03B 7/072* (2013.01); *E03C 1/025* (2013.01); *F16L 55/24* (2013.01); *F17D 3/01* (2013.01); *F17D 5/00* (2013.01); *G01F 1/849* (2013.01); *G01F 15/063* (2013.01); *G01F 25/0092* (2013.01); *G06Q 10/20* (2013.01); *A62C 35/58* (2013.01); *F16L 2101/12* (2013.01)

(58) Field of Classification Search
CPC . F17D 5/00; F17D 3/01; G01F 15/063; G01F 25/0007; G01F 1/849; G01F 25/0092; E03B 7/08; E03B 7/006; E03B 7/072; E03B 7/04; Y10T 137/0424; E03C 1/025; E03C 1/02; A62C 35/58; F16L 55/24; F16L 2101/12; B08B 9/0321
See application file for complete search history.

(56) References Cited

U.S. PATENT DOCUMENTS

| | | | | |
|---|---|---|---|---|
| 5,082,013 A | * | 1/1992 | Scheib | A62C 35/20 137/1 |
| 5,360,488 A | * | 11/1994 | Hieatt | C11D 7/08 134/22.12 |

(Continued)

*Primary Examiner* — Atif H Chaudry
(74) *Attorney, Agent, or Firm* — Gutwein Law; Tyler Droste

(57) ABSTRACT

A method and system for measuring, controlling, and recording flushing of a water distribution system (WDS) comprising each portion or subject WDS piping, by measuring, controlling and recording the selected flow rate ranges of water into and out of. The selected volume of water utilized into and out of the WDS piping can then be measured, controlled and recorded. The flow rate and volume of water into and out of the WDS piping can then be selected for each maintenance event protocol and used to determine the condition of the WDS.

16 Claims, 26 Drawing Sheets

(51) Int. Cl.
  *E03C 1/02*    (2006.01)
  *F16L 101/12*  (2006.01)
  A62C 35/58     (2006.01)

(56) References Cited

U.S. PATENT DOCUMENTS

| | | | | |
|---|---|---|---|---|
| 5,527,395 | A * | 6/1996 | Perry | E03B 7/006 |
| | | | | 134/41 |
| 6,627,089 | B1 * | 9/2003 | Wilkinson | B08B 9/0325 |
| | | | | 134/22.12 |
| 8,104,496 | B1 * | 1/2012 | Washington | E03B 7/006 |
| | | | | 137/15.04 |
| 2001/0002597 | A1 * | 6/2001 | Addo | F16K 15/038 |
| | | | | 137/512.1 |
| 2011/0031195 | A1 * | 2/2011 | Wilkinson | B08B 9/0321 |
| | | | | 210/801 |
| 2017/0350100 | A1 * | 12/2017 | Atkins | G01D 9/005 |

* cited by examiner

SYSTEM AND METHOD FOR INFRASTRUCTURE AND ASSET MANAGEMENT

CROSS-REFERENCE TO RELATED APPLICATION

This U.S. Patent Application claims priority to U.S. Provisional Application: 62/696,050 filed Jul. 10, 2018, the disclosure of which is considered part of the disclosure of this application and is hereby incorporated by reference in its entirety.

FIELD OF THE INVENTION

This invention relates generally to directed systems and methods of monitoring and controlling infrastructure and asset management, such as, but not limited to, the supply and use of commercial, industrial, or residential water, gas and/or electric utilities and assets. In one aspect, the invention relates to a system for measure, controlled, and recorded flushing of a water system.

BACKGROUND

Industrial sites and municipalities "area" water piping accumulates sand, soil, grit, hard water scale, rust, debris, biological growth and/or other precipitates and constituents from the water source, treatment and distribution, (fouling). Pressurized ambient or near ambient water distribution systems consisting of pipes, fittings, valves, and hydrants have been maintained by rapidly flowing water out of the water distribution system though open hydrants. The hydrants only properly operated when fully open and not controlled based on any local measurement. The flow rate was maximized, and the volume of water discharged through each subject hydrant was based on a preset time period, time available, volume of water available in storage, opacity of the discharged water, color within the water, and/or visually observed fouling. The hydrants are opened in systematically based on a convenient transportation route through the area. This is considered "traditional" maintenance and is called "flushing".

Water flow rates are so high much consideration must be given to prevent the discharge damage to nearby parked cars, traffic, pavement, and landscaping. The traditional flushing as occurs based a convenient schedule with consideration of avoiding local low water pressure, the discharged water freezing and/or otherwise causing inconvenience and/or hazards from puddling. The amount of water discharge is estimated based normal water consumption before and after traditional flushing. The amount of discharge is many times that needed to remove fouling. The energy and chemical investments are then not available for further use. The discharged water required electrical energy and addition of valuable chemicals, so should be minimized.

The separate events for the opening and closing of the hydrants and valves are labor consuming and would benefit from time reduction. Many devices are not utilized during traditional flushing. Operation of the remaining valves and hydrants greatly increases the probability of their availability. The water utilized for cleaning, scouring, and/or removal of biological growth, films and slimes is not examined. The examination of the water utilized for biological growth, films and slimes aides in determination of future flushing. Measure Controlled and Recorded ("MCR") flushing improves on traditional flushing procedures and methods.

There exists a need for a measured, controlled and recorded flushing system for each portion or subject water distribution system piping. Furthermore, there exists a need for improved system and method for infrastructure and asset management.

BRIEF SUMMARY OF THE INVENTION

In one aspect, this disclosure is related to a method and system for measured, controlled, and recorded flushing comprising each portion or subject water distribution system piping, by measuring, controlling and recording the selected flow rate ranges of water into and out of; measuring, controlling and recording the selected volume of water utilized into and out; flow rate and volume of water into and out of the water distribution system piping is selected for each maintenance event. Wherein, this process concurrently provides for the determination of pressure drop, fouling, obstructions, tuberculation and/or occlusions before and after. The direction of water flow is also reversed for the determination of pressure drop, fouling, obstructions, tuberculation and/or occlusions before and after. Furthermore, depending on the direction of water flow, important differences in pressure drop, fouling, obstructions, tuberculation and/or occlusions may be frequently determined. The portion or subject piping may be as short as the distance between hydrants (normally about 500 feet) or as much as about several thousand feet.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein:

FIG. 12 is a schematic of an exemplary process implemented by the system.

DETAILED DESCRIPTION OF THE INVENTION

Figure 1:
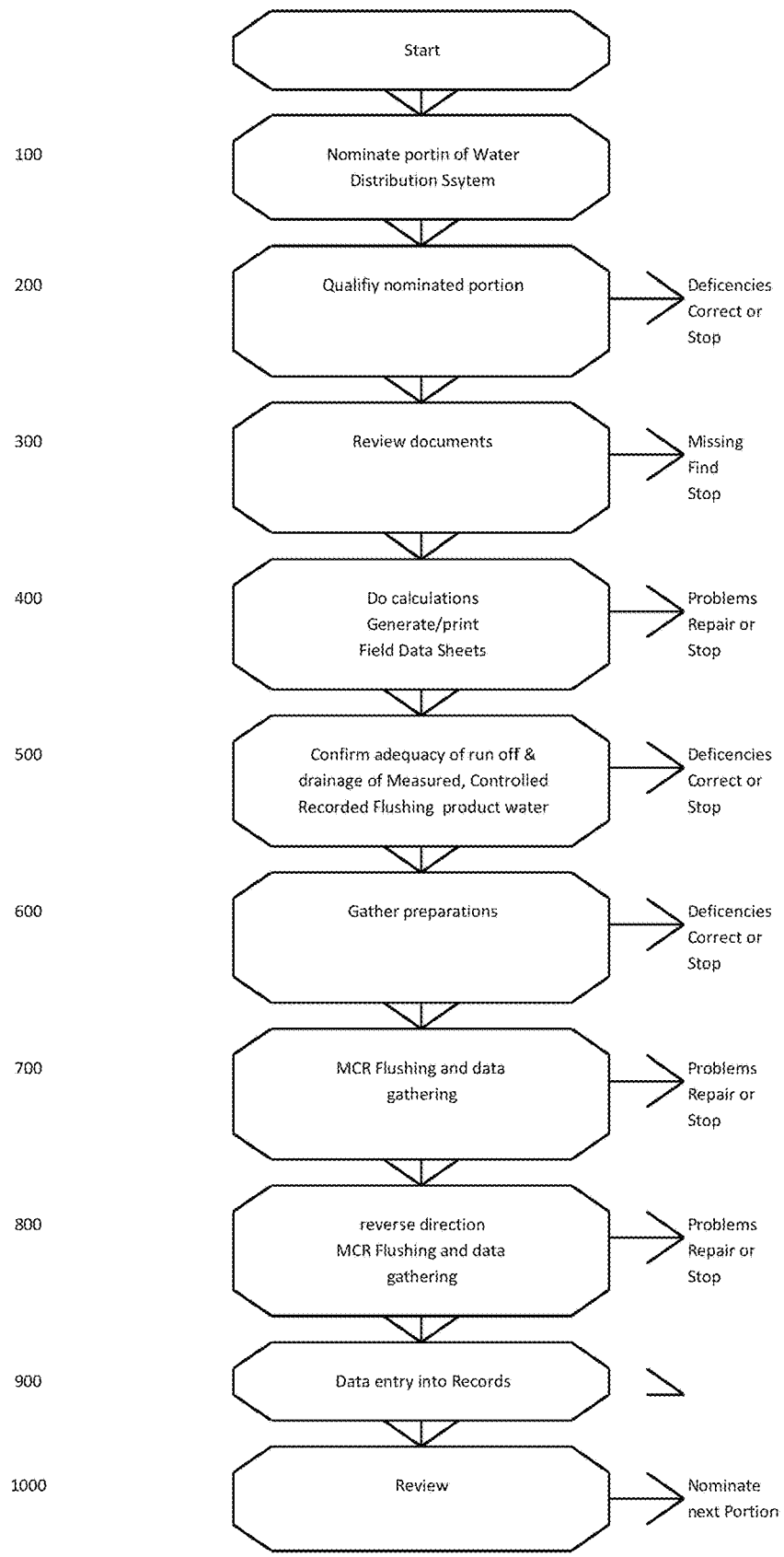
FIG. 1 is a flow chart of an exemplary implementation of a method within the technology.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. Similarly, coupled can refer to a two member or elements being in communicatively coupled, wherein the two elements may be electronically, through various means, such as a metallic wire, wireless network, optical fiber, or other medium and methods.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

One embodiment of the invention is directed to an infrastructure monitoring system. The system includes an operations center, and a number of monitoring devices in communication with the operations center. Each monitoring device has at least one sensor sensing at least one condition within an infrastructure, a data storage device storing data sensed by the sensors, a communications device to transmit and receive data, and a processor in communication with a sensor, the data storage device, and/or the communications device. At least one monitoring device monitors a first aspect of the infrastructure and at least one monitoring device of monitors a second aspect of the infrastructure.

In some preferred embodiments, the operations center and the monitoring devices are in wireless communication. In other embodiments, at least one output device is in communication with the operations center. Each output device has a communications device to receive and/or transmit data, at least one output port, and a processor in communication with the communications device and/or the at least one output port.

In one embodiment, the system can include first discharging water from a portion of a water distribution system, a flow control valve can be disposed along the water passageway where the flow control valve permits or prohibits a flow of the water through the water passageway. A water sampling apparatus or one or more sensors can be used for obtaining water sample data corresponding to a sample of the water from the water passageway. A computing means having a processor can be configured to receive the water sample data from the water sampling apparatus/sensor and measure a plurality of water source information, such as water quality levels from the water source information. A memory in electrical communication with the processor can be configured to store a plurality of selectable programs. The processor can be configured to initiate various store programs on the memory. The programs can be manually initiated by a user or automatically initiated by the system depending upon pre-determined initiation event. The initiation event can in some embodiments be time based, data based, or other basis as desired by the user.

In some exemplary embodiments, a wired connection with other devices/networks may be by any appropriate standard or proprietary hardware and connectivity protocols. For example, the system may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Alternatively, a wireless connection with other devices/networks may similarly be by any appropriate standard or proprietary hardware and communications protocols. For example, the system may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

The present disclosure generally provides a system and method for infrastructure and asset management, such as municipal water system. As shown in FIGS. 1-13 the system provides flow charts of methods/programs/protocols that may be implemented by the system. The programs can include but are not limited to a means to nominate a portion of the water distribution system for MCR flushing (100s); qualifying the nominate portion(s), when/if there are deficiencies the system can trigger a notification or an alert to correct or stop the program (200s) review documents covering the nominated portion, if there are any missing find or stop the protocol (300s); input the raw data causing calculations, generate and print Field Data Sheet, if there are problems repair or stop (400s); confirm adequacy of run off and drains of the MCR flushing product water if deficiencies correct or stop (500s); gather the tools and other items in preparation, if deficiencies correct or stop (600s); conduct for the nominated portion the MCR flushing and gather the resulting date if there are problems repair or stop (700s); initiate a reverse direction and again conduct/monitor for the nominated portion the MCR flushing and gather the resulting data and store, if there are problems repair or stop (800s); enter or populate the field data into the records and memory of the system (900s); and review the results and supporting data (1000s).

Figure 2:
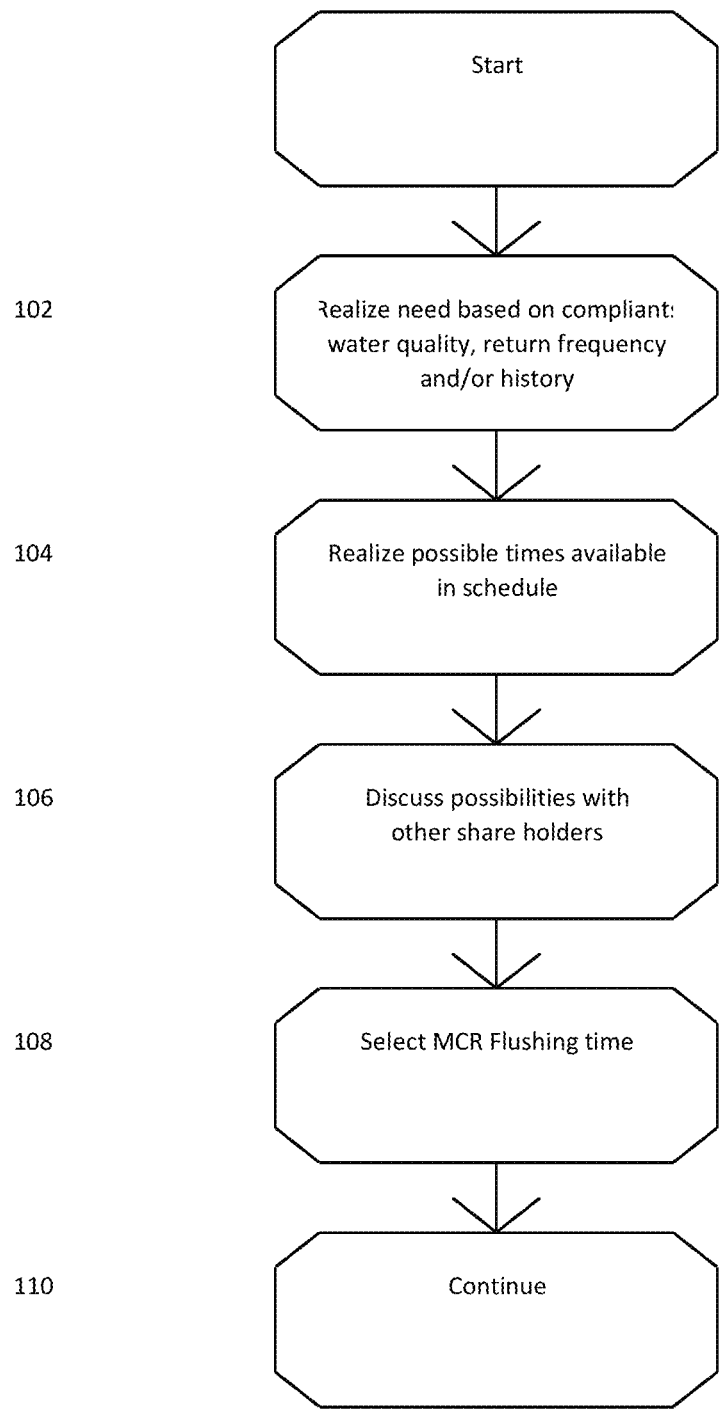
FIG. 2 is a flow chart of an exemplary implementation of a method within the technology.

As shown in FIG. 2, the system can initiate a first program that can first determine the need for a treatment, such as MCR flushing based on compliant, water quality, return frequency, history, and or other data or pre-determined initiation point 102. The system can the determine and optimize the possible times available in schedule based upon acquired use data. The information obtained can then be transmitted to a user to alert one or more options 106. The system can the based upon the collected data an use input, select the MCR flushing time.

Figure 3:
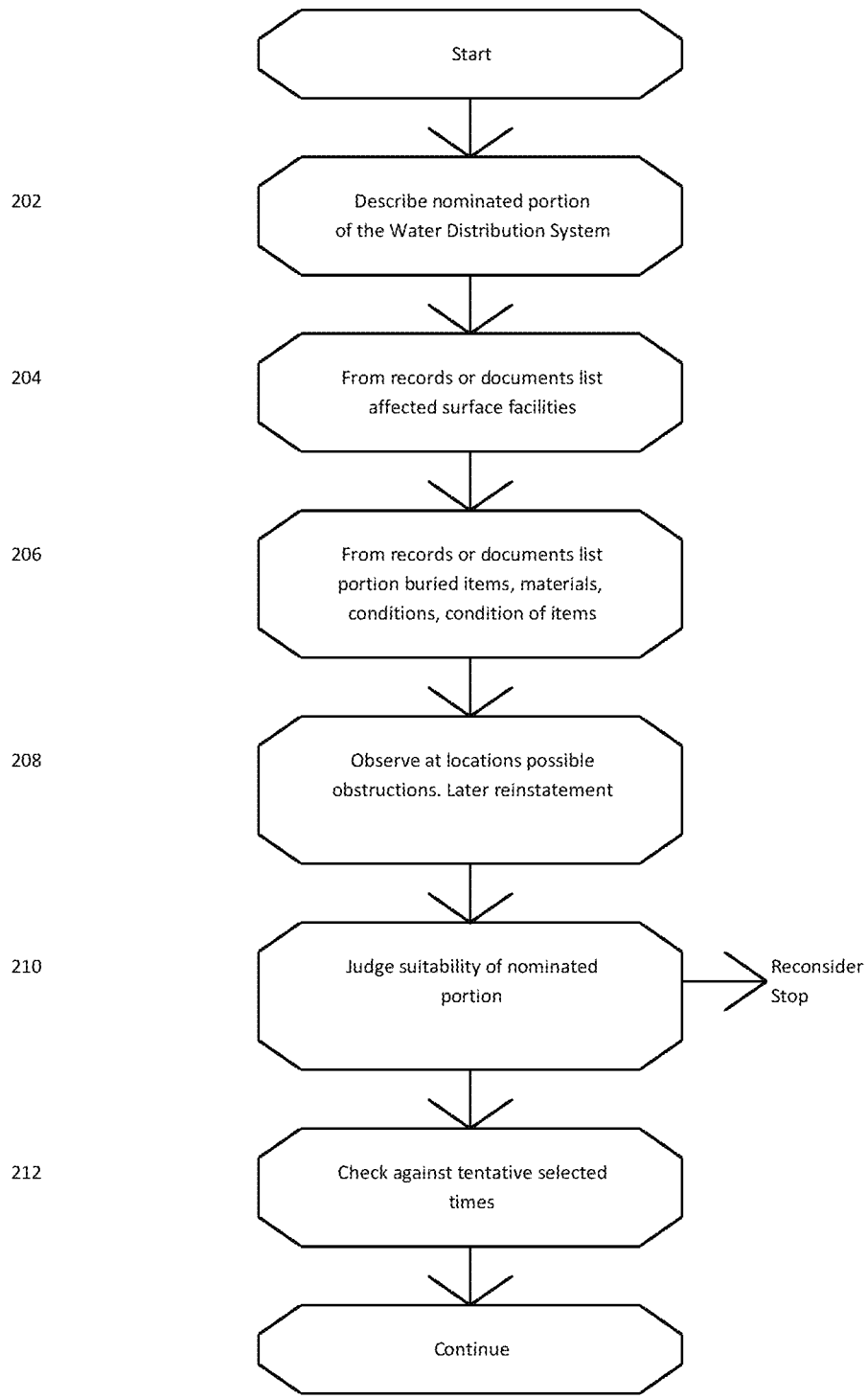
FIG. 3 is a flow chart of an exemplary implementation of a method within the technology.

As further shown in FIG. 3, the system can then initiated the next protocol that can first provide and characterize the nominated portion of the Water Distribution System needed for service 202. The protocol initiated by the system can then use the data and records or documents to list and designate affected surface facilities 204. From records or documents list portion buried items, materials, conditions, condition of items can then be recorded and transmitted to the system 206. Additionally, the system can determine and observe locations that may include possible obstructions 208. Based upon the collected data, the system can the determine suitability of nominated portion 210 and can then reconsider or stop 212 based upon the suitability of the portion.

Figure 4:
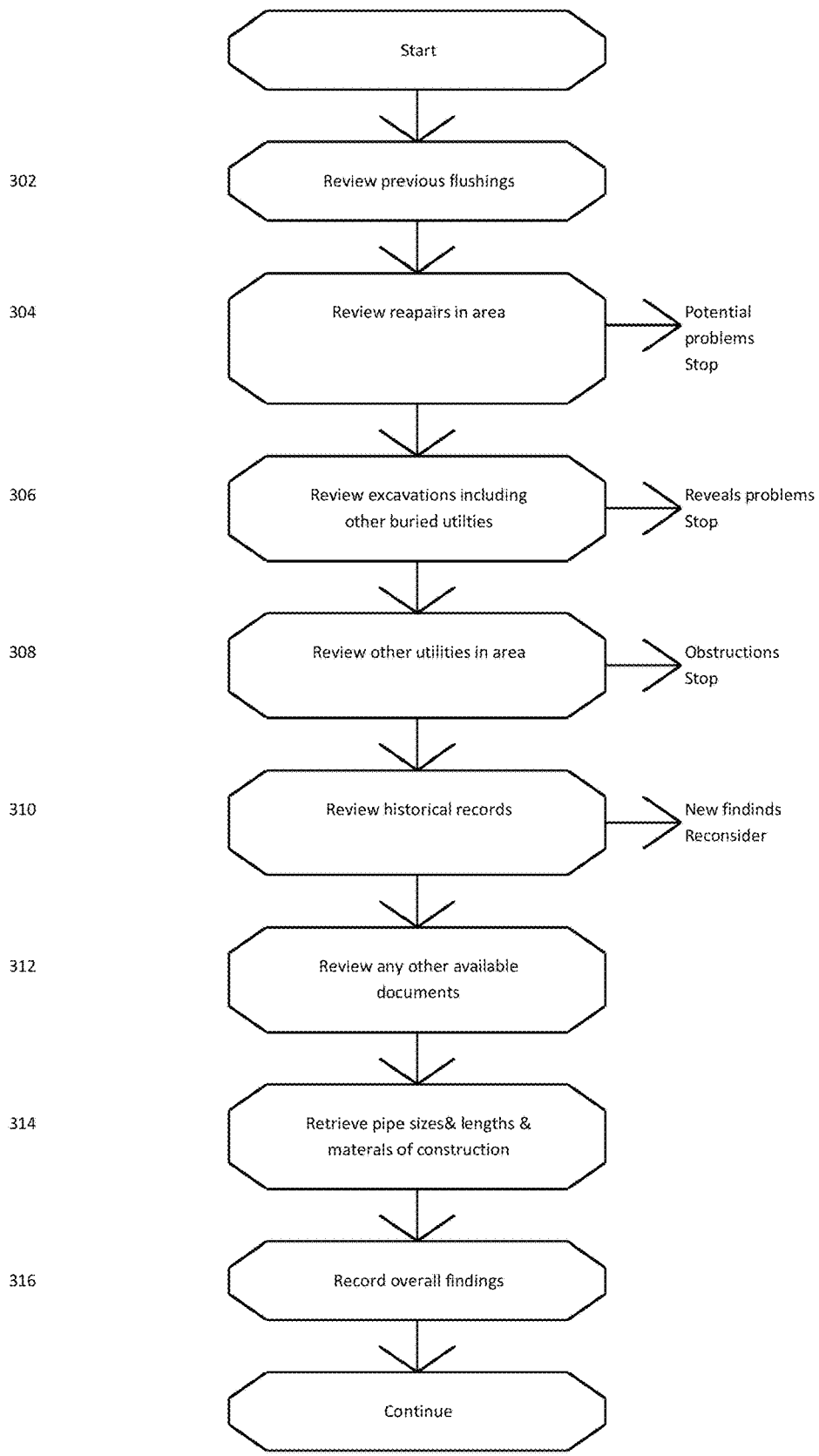
FIG. 4 is a flow chart of an exemplary implementation of a method within the technology.

Next, as shown in FIG. 4, the system may initiate then next protocol that can include checking against tentative selected times and review/analyzing previous flushing data 302. The system can then determine the existence of any other repairs in the area and if they do exist, report and initiate an alert to a user and/or stop the protocol 304. The protocol can the asses and review excavations including potential hazards and other buried utilities if problems 306. If a hazard is detected the system can stop and/or alert a user 306. Similarly, the system can assess other utilities in area if obstructions stop 308. The system can then analyze and assess historical records, if additional data related to the protocol is found, the system can alert and reconsider the initiation of the protocol 310. Additionally, any other available data or documents can be analyzed an assessed 312. Pipe size, length and material data can be assessed and analyzed by the system 314 and the overall findings can then be recorded and stored in the memory.

Figure 5:
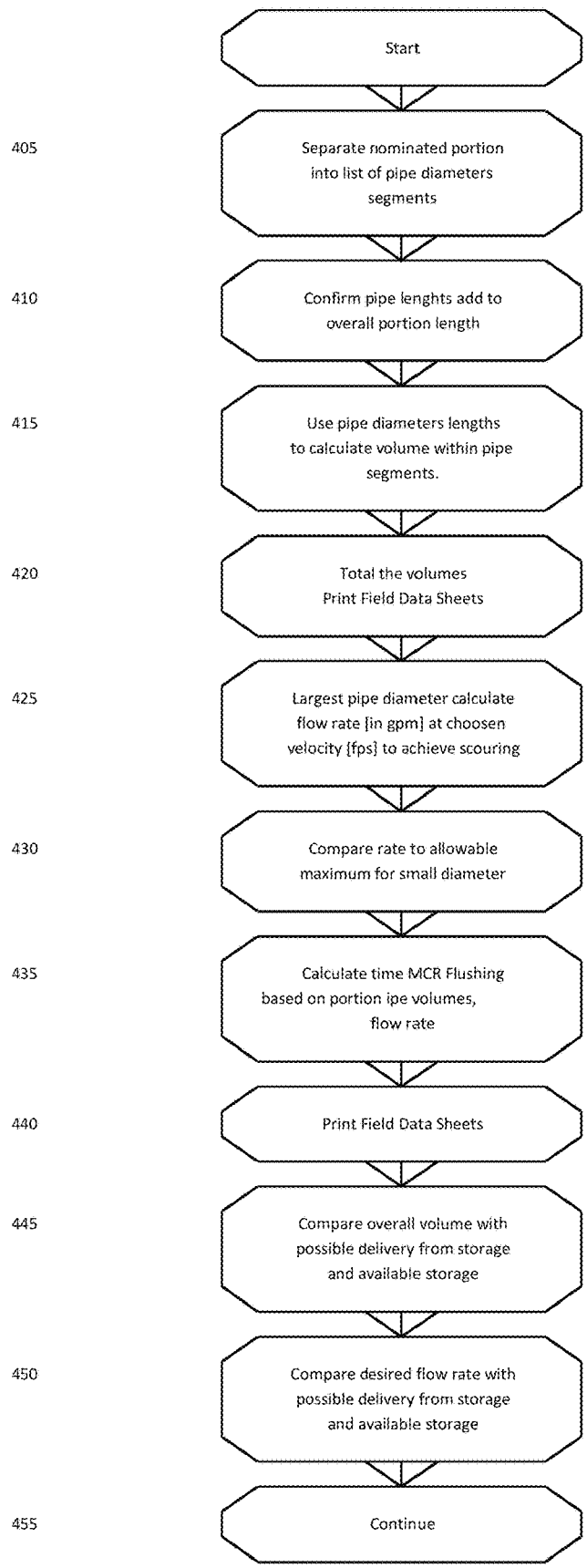
FIG. 5 is a flow chart of an exemplary implementation of a method within the technology.

As shown in FIG. 5, the system can then separate the nominated portions into list of pipe diameter and material of construction segments 405. The system can then confirm the pipe lengths add into overall portion length data 410. The pipe diameter lengths to can be used to calculate the volume within the pipe segments 415. The volumes can then be totaled, and field data sheets can be transmitted to a user 420. In some exemplary embodiments, the system can use the largest pipe diameter to calculate flow rate [in gallons per minute] at chosen velocity [feet per second] to achieve scouring data 425. The scouring data rate can then be compared to the allowable maximum for small diameter. If the rate is determined by the system to be in excess, the system can reconsider and reinitiate the protocol for the segment or stop 430. The system can the calculate time of the MCR flushing based on portion pipe volumes and/or flow rate 435. The system can then generate and transmit a Field Data Sheet to a user 440. The system can then compare and analyze the overall volume with possible delivery from storage and available from storage, if it exceeds the number then the system can determine to proceed or stop the protocol 445. The system can additionally compare desired flow rate with possible delivery from storage and available storage 450. If this result exceeds the number, then the system can determine to proceed or stop the protocol.

Figure 6:
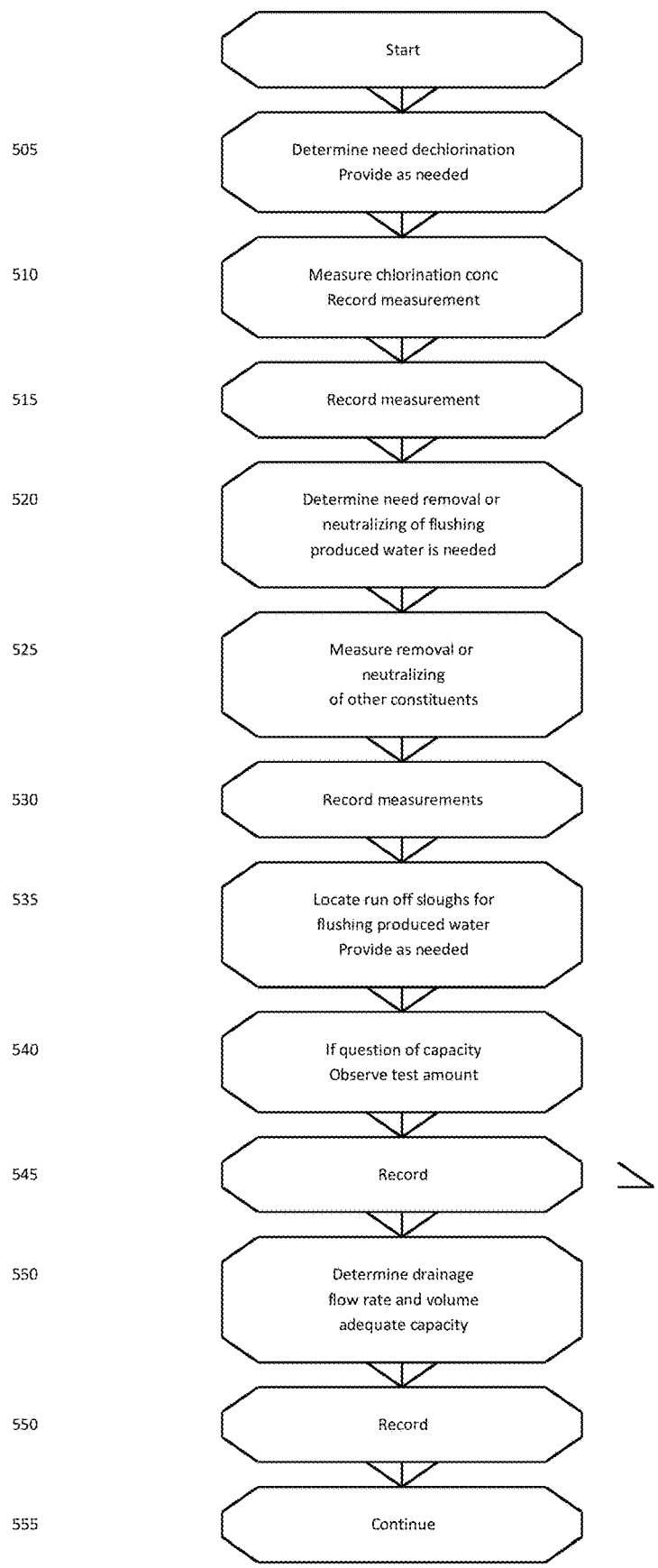
FIG. 6 is a flow chart of an exemplary implementation of a method within the technology.

As shown in FIG. 6 the system can then initiate a protocol to next analyze and determine the need for dechlorination and provide such dechlorination as needed 505. The system can then initiate a measurement to confirm removal of chlorine 510 and then record and store the measurement confirming dichlorination 515. The system can the determine the need for removal or neutralizing of flushing produced water 520 and then measured removal or neutralization of other constituents 525 and record and store those measurements 530. The system can then locate run off slough or drains for flushing produced water and provide as needed 535. The system can determine and analyze the suitability of the slough or drains capacity and initiate a test amount if the found to be in a pre-determined range 540. The system can then record and store the runoff drains test results/data 545, determine by observation actual run off drains flow rate and volume capacity the adequacy 550, and record and store the actual use results 555.

Figure 7A:
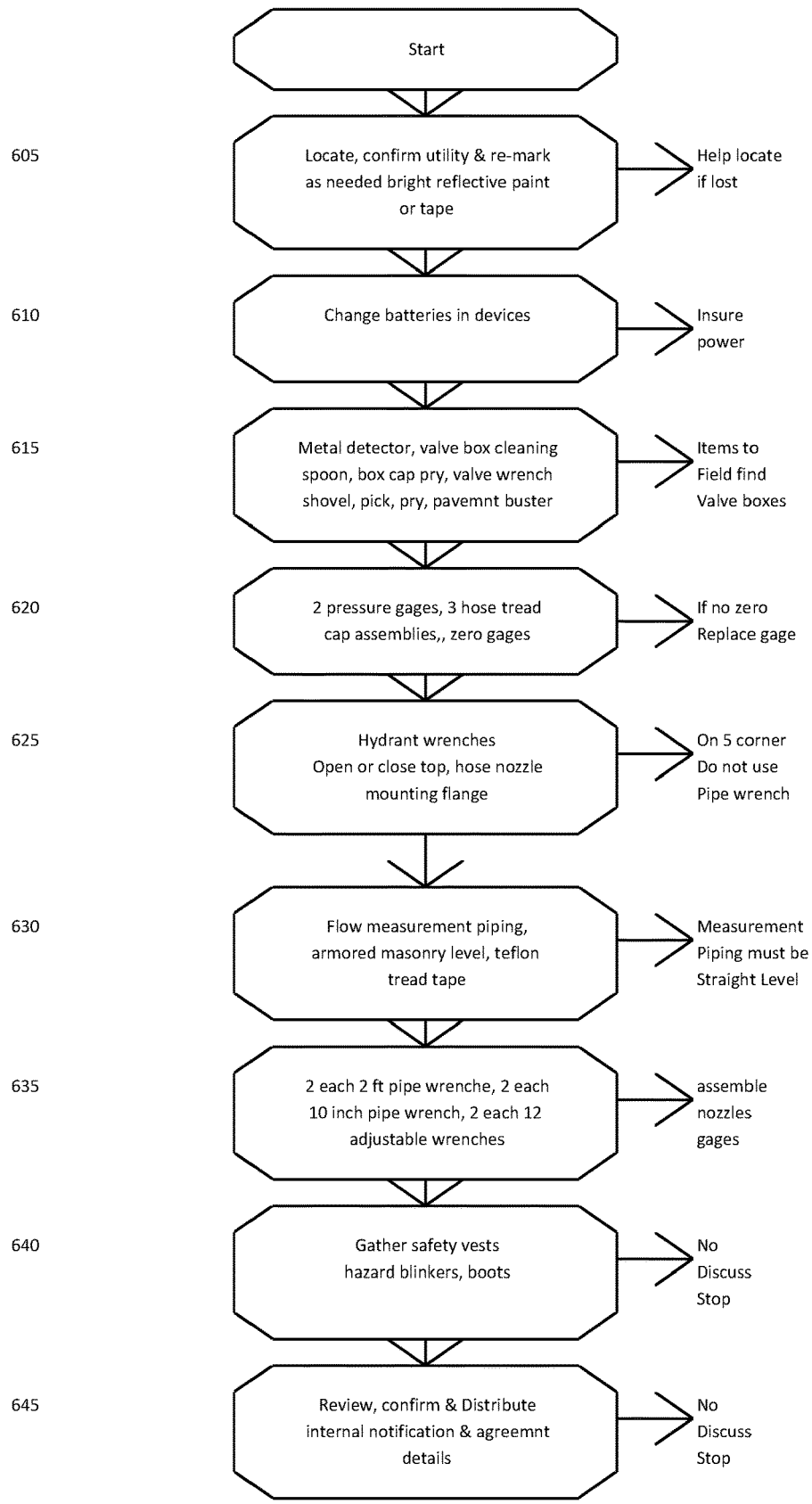
FIGS. 7a-b is a flow chart of an exemplary implementation of a method within the technology.
Figure 7B:
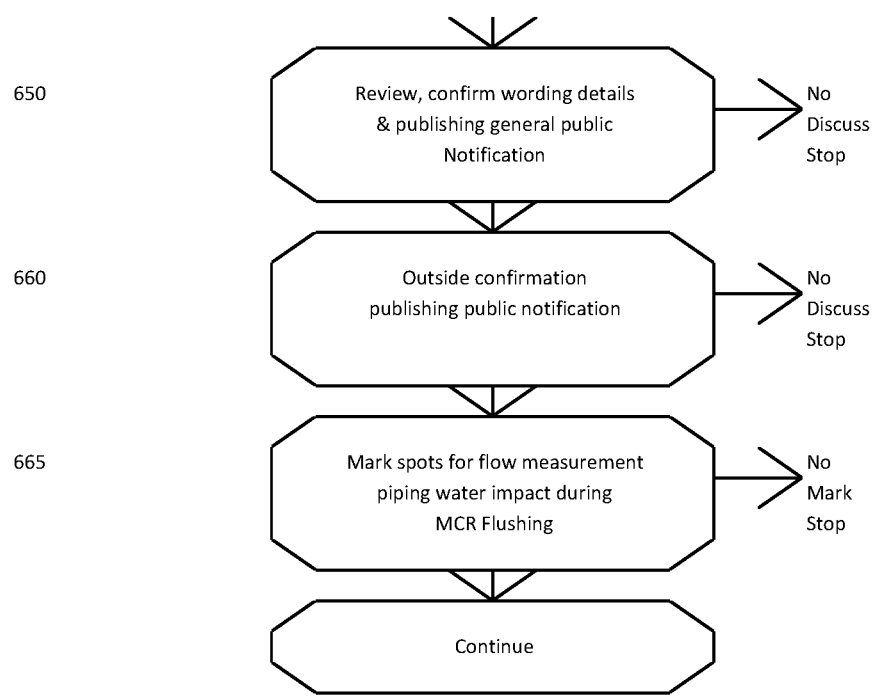
Figure 8A:
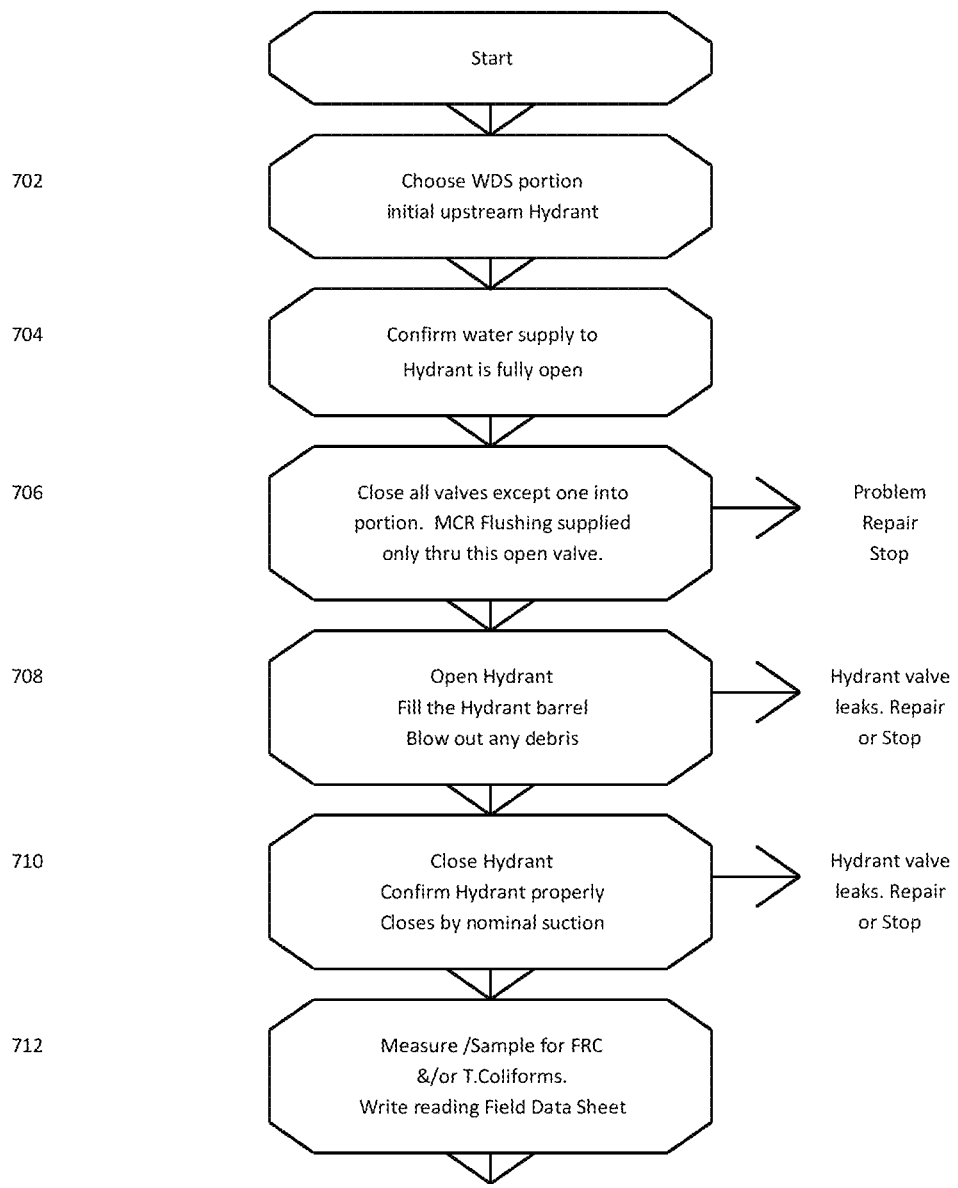
FIGS. 8a-g is a flow chart of an exemplary implementation of a method within the technology.
Figure 8B:
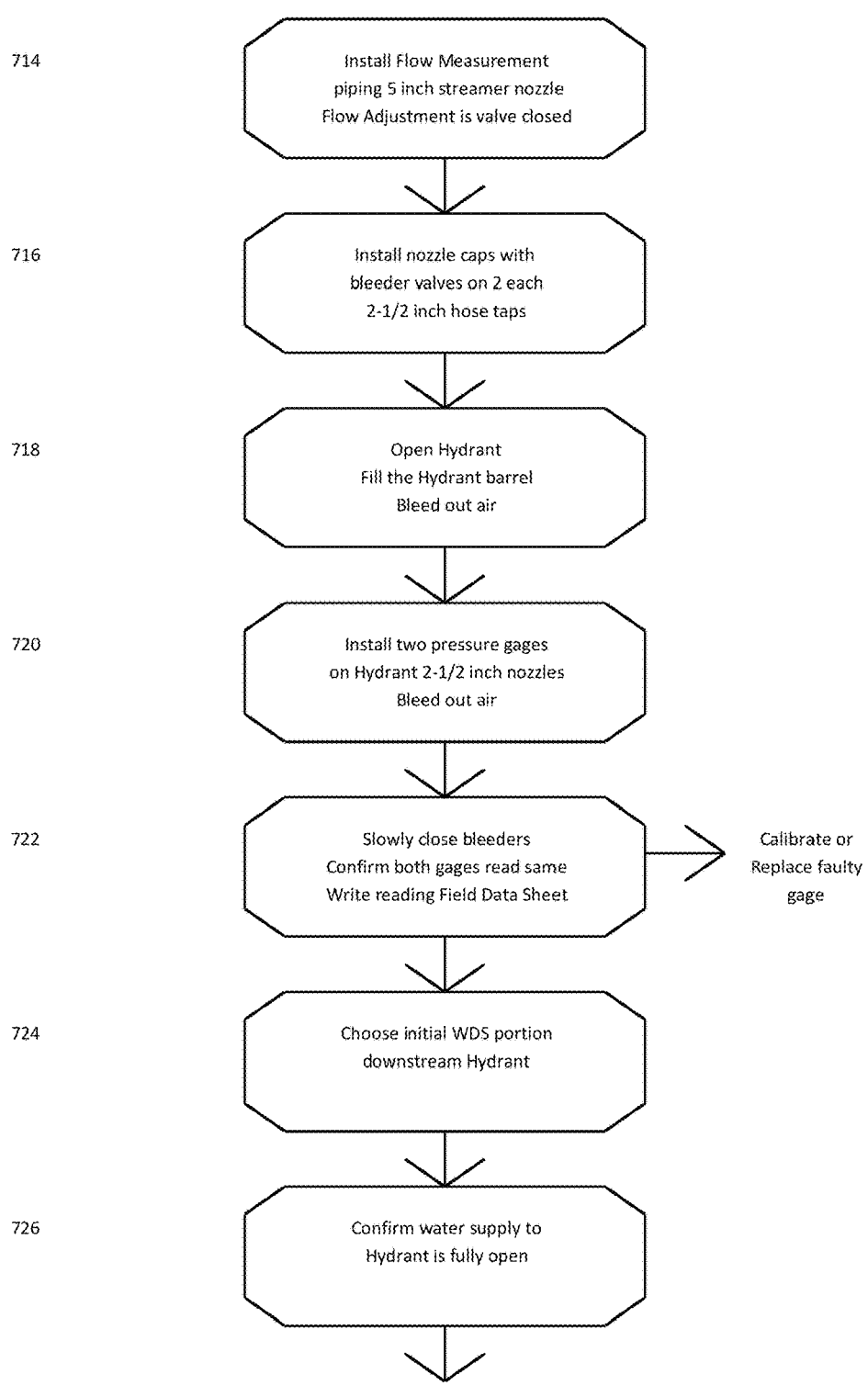
Figure 8C:
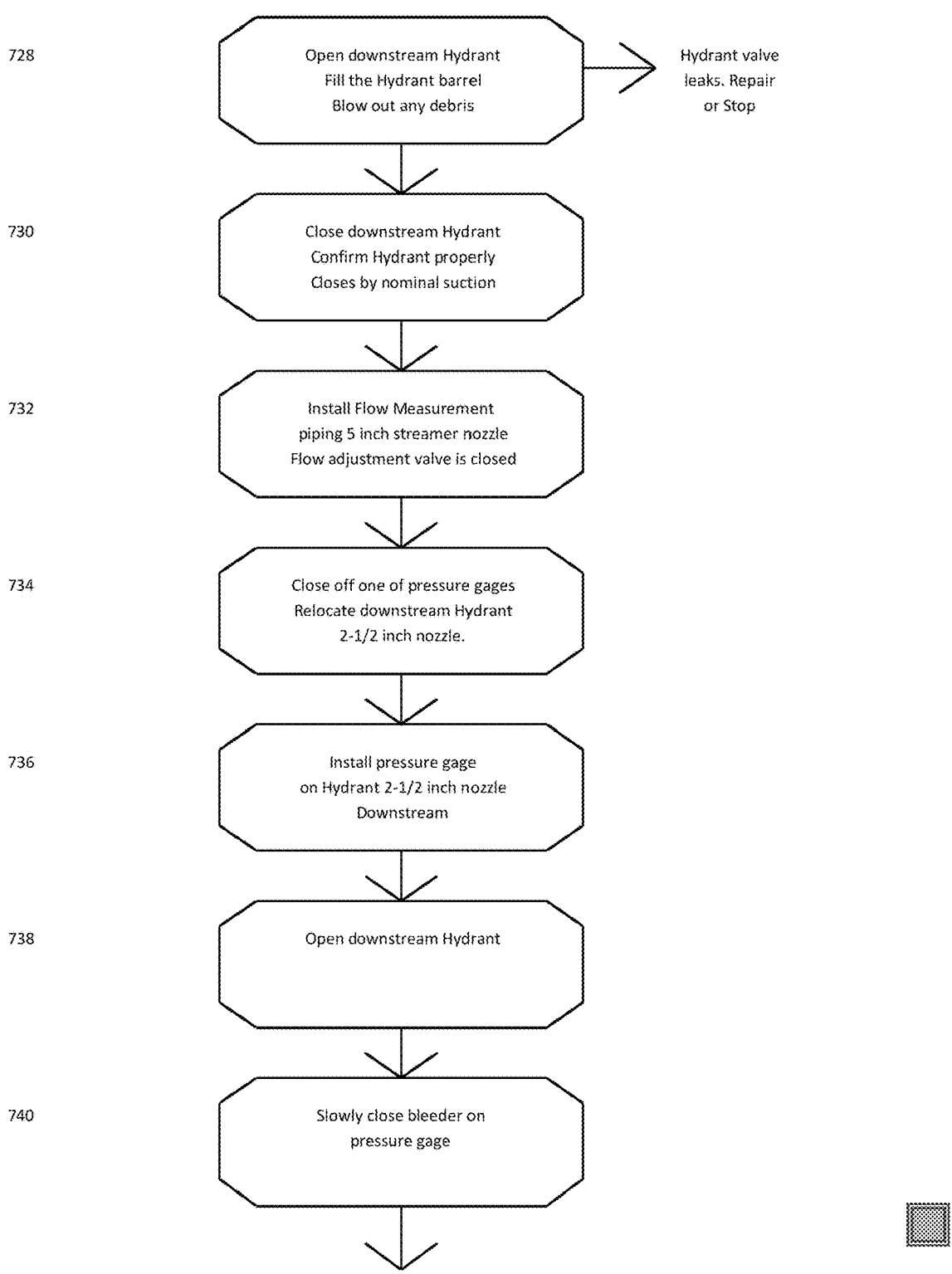
Figure 8D:
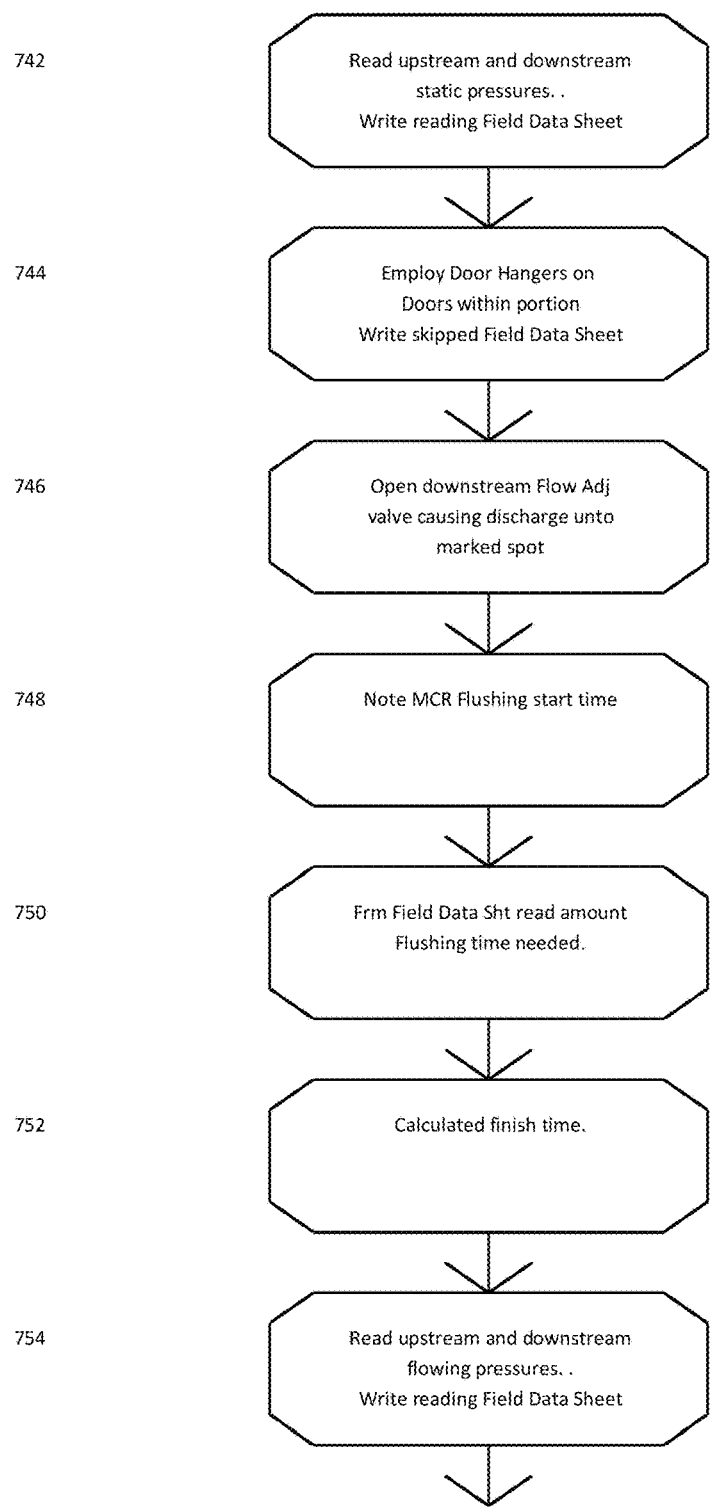
Figure 8E:
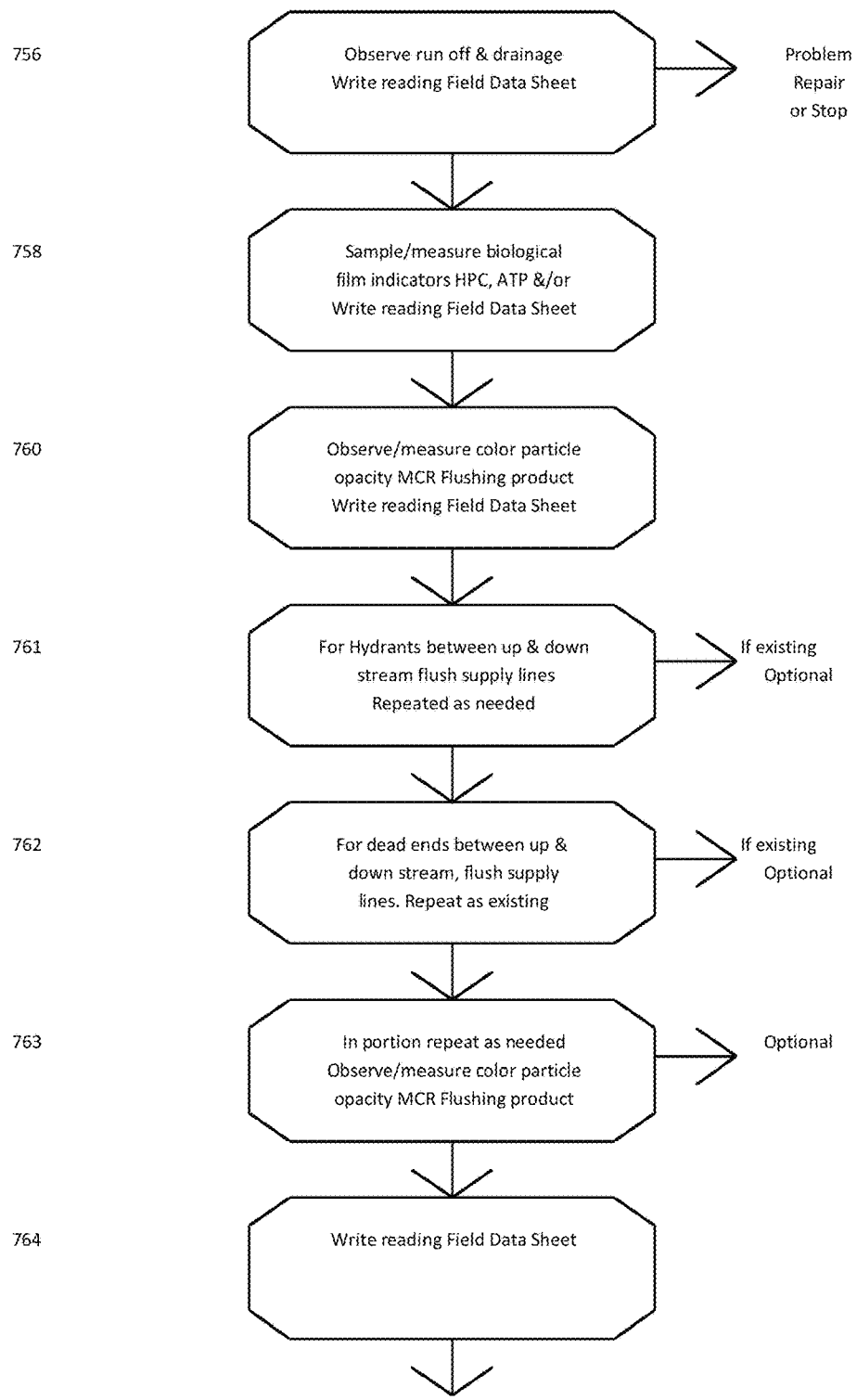
Figure 8F:
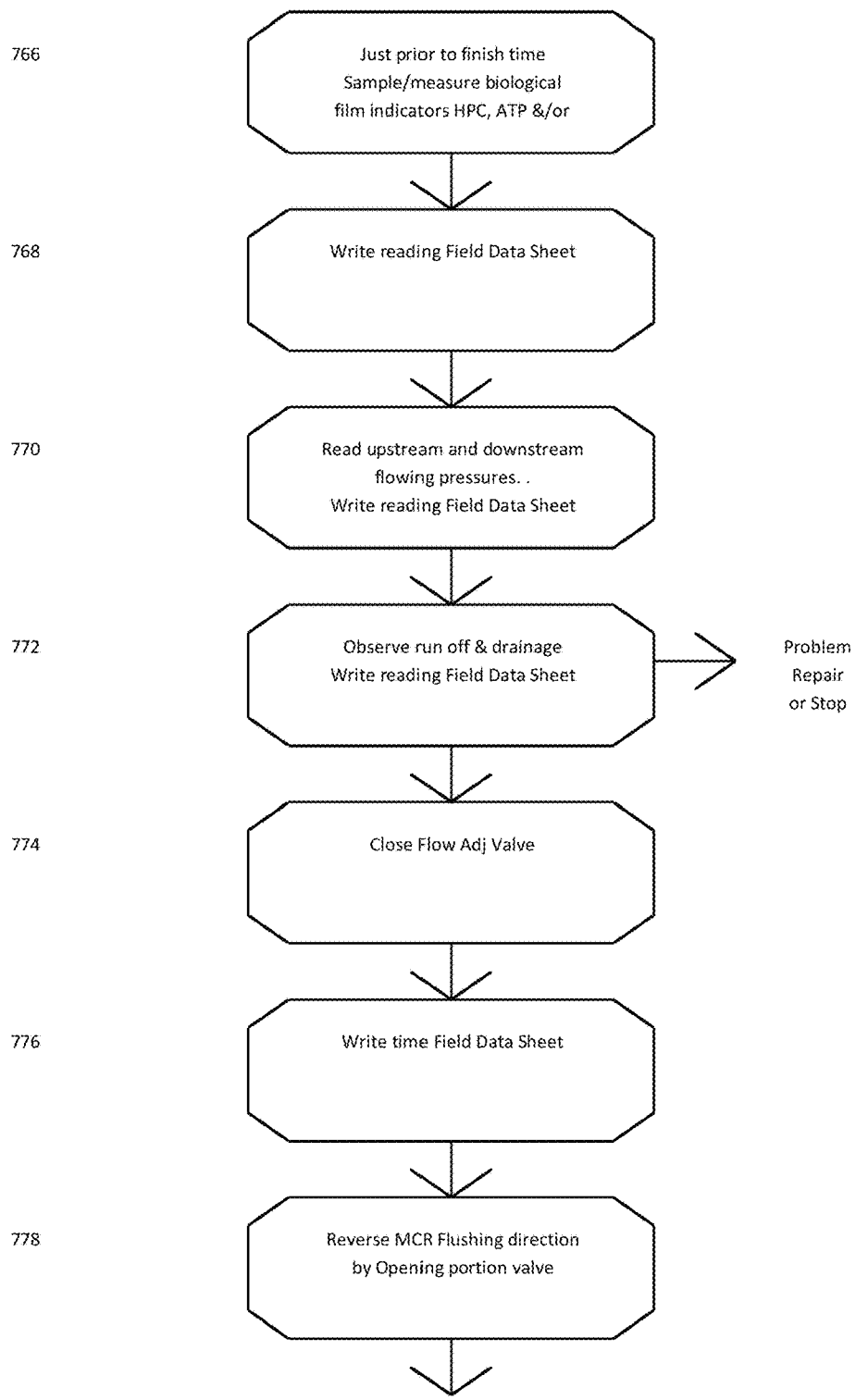
Figure 8G:
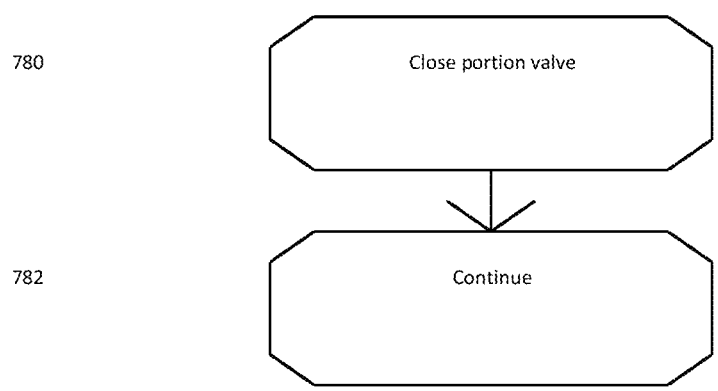
Figure 9A:
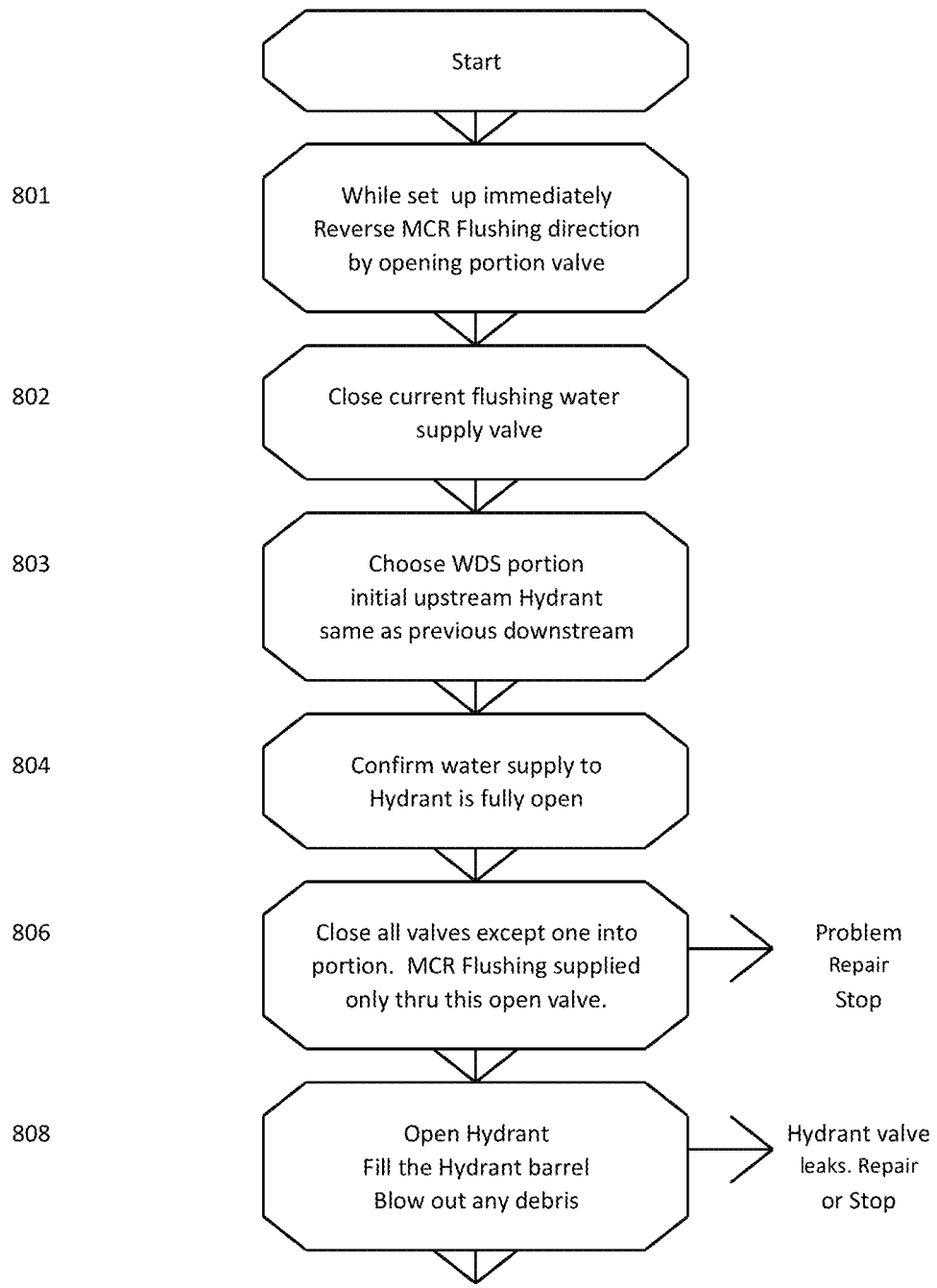
FIG. 9a-f is a flow chart of an exemplary implementation of a method within the technology.
Figure 9B:
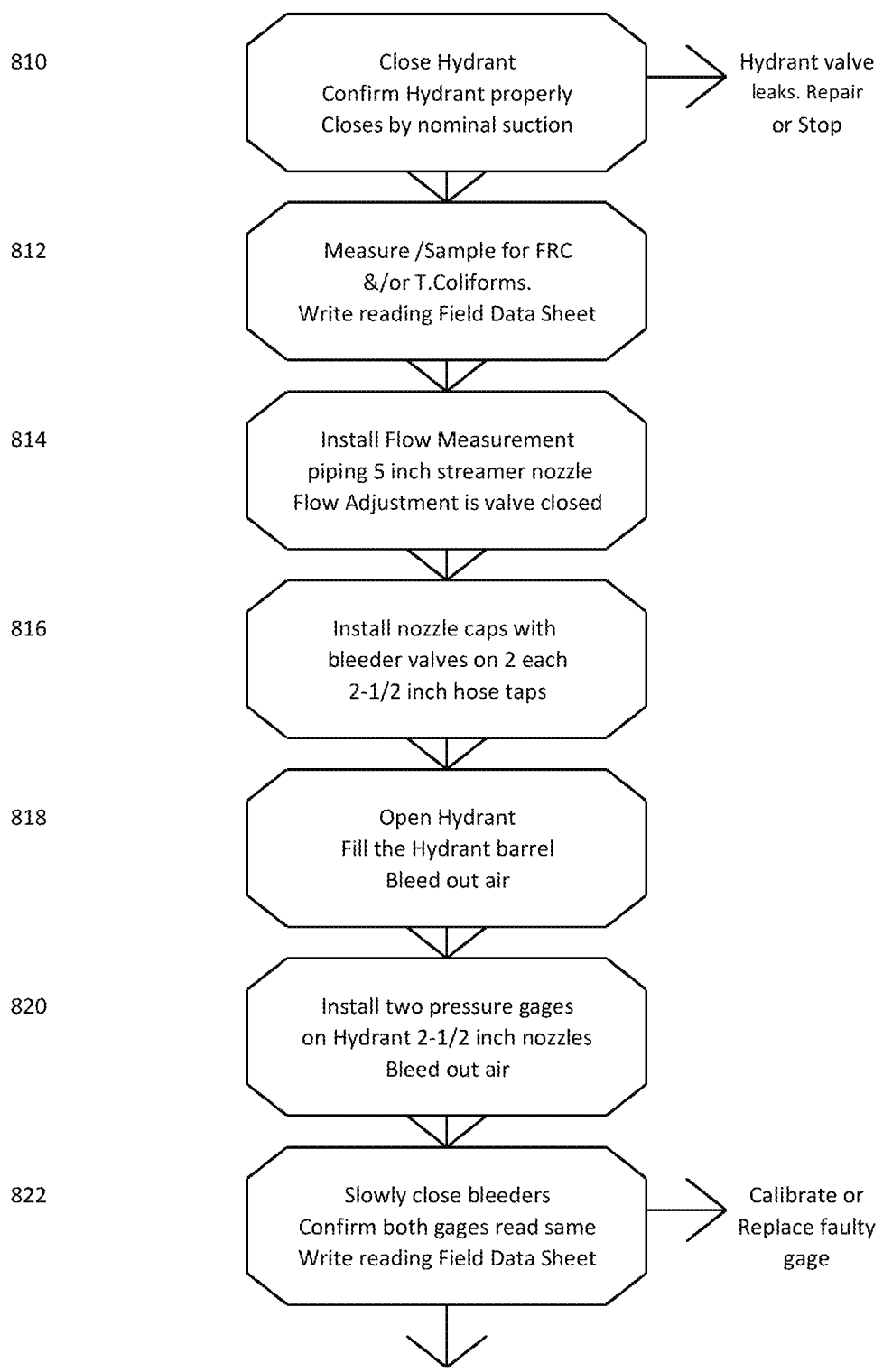
Figure 9C:
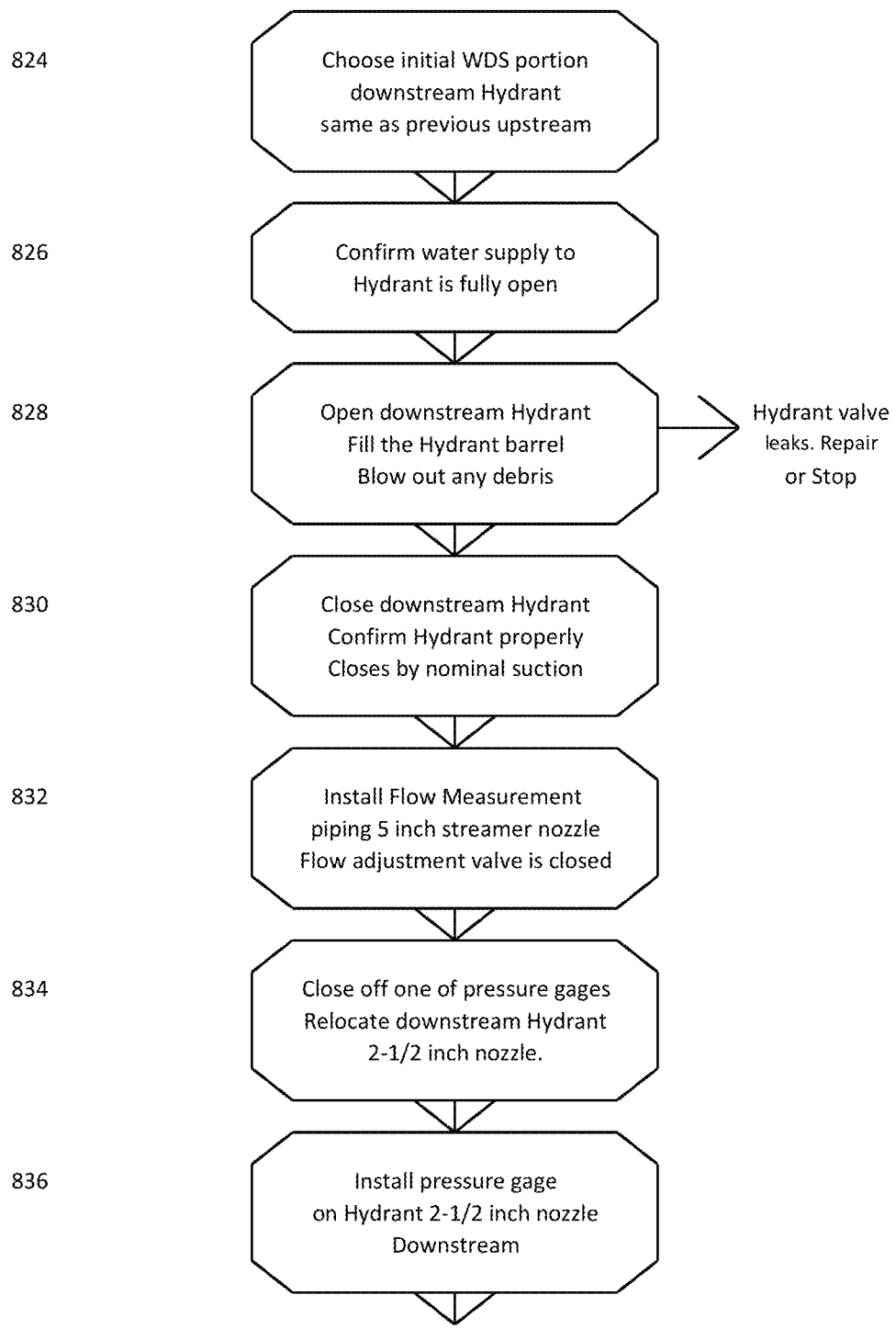
Figure 9D:
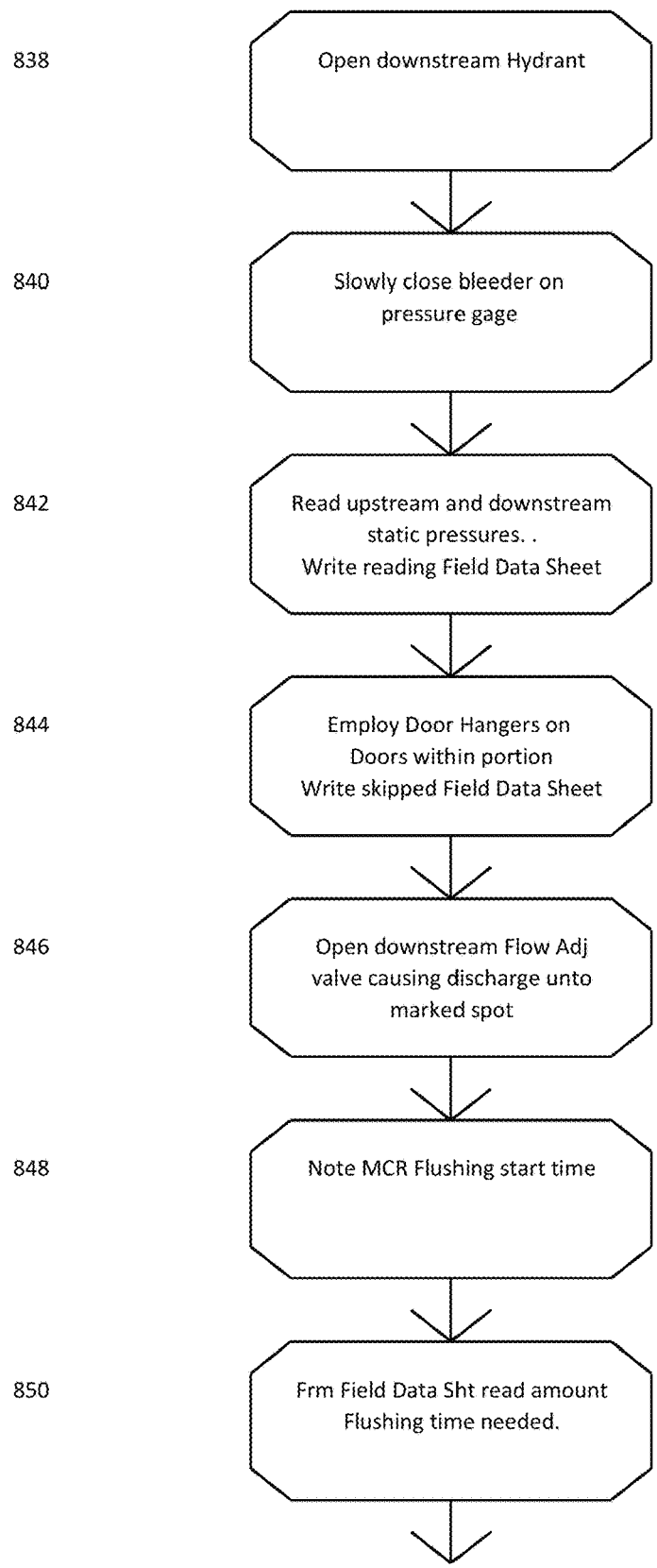
Figure 9E:
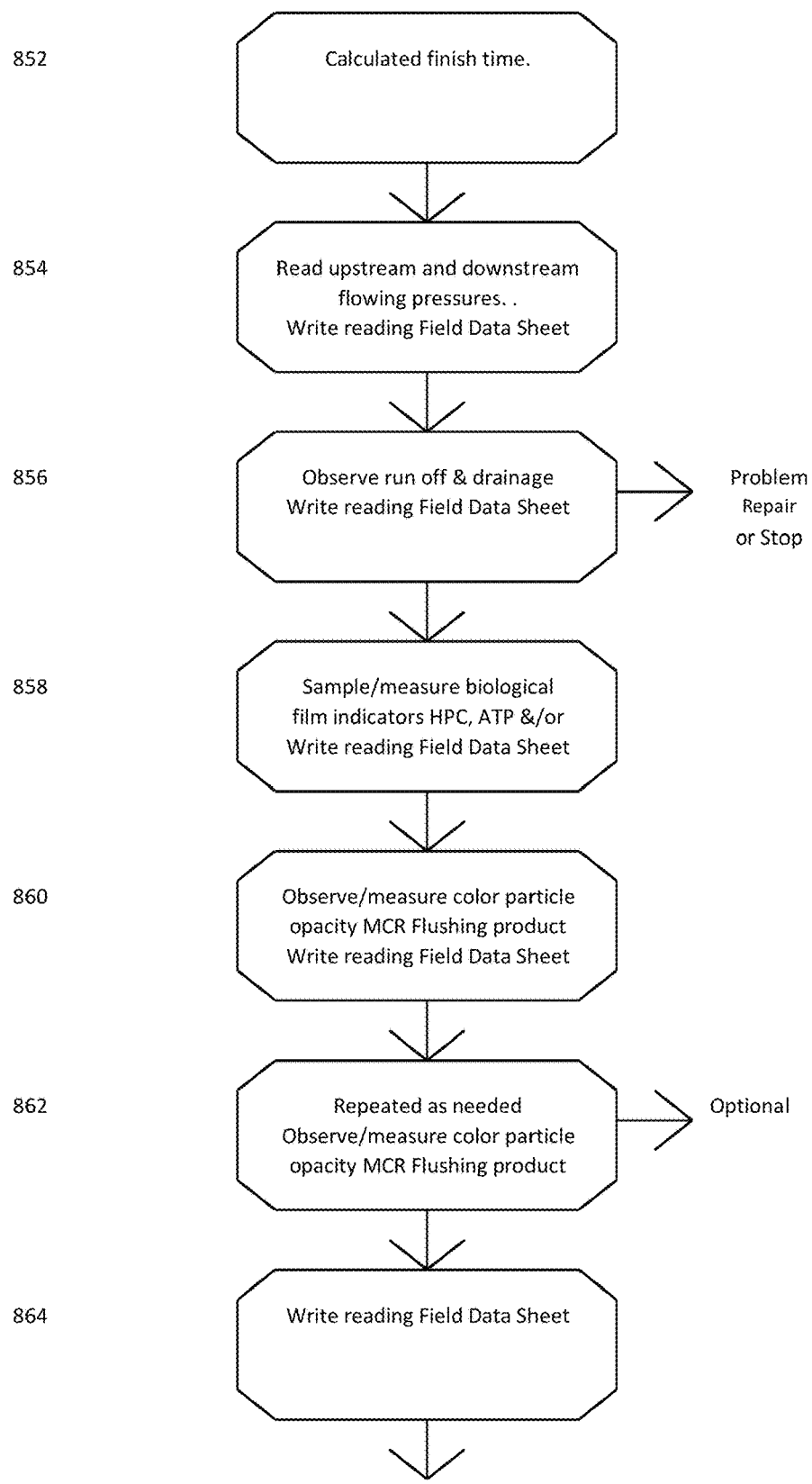
Figure 9F:
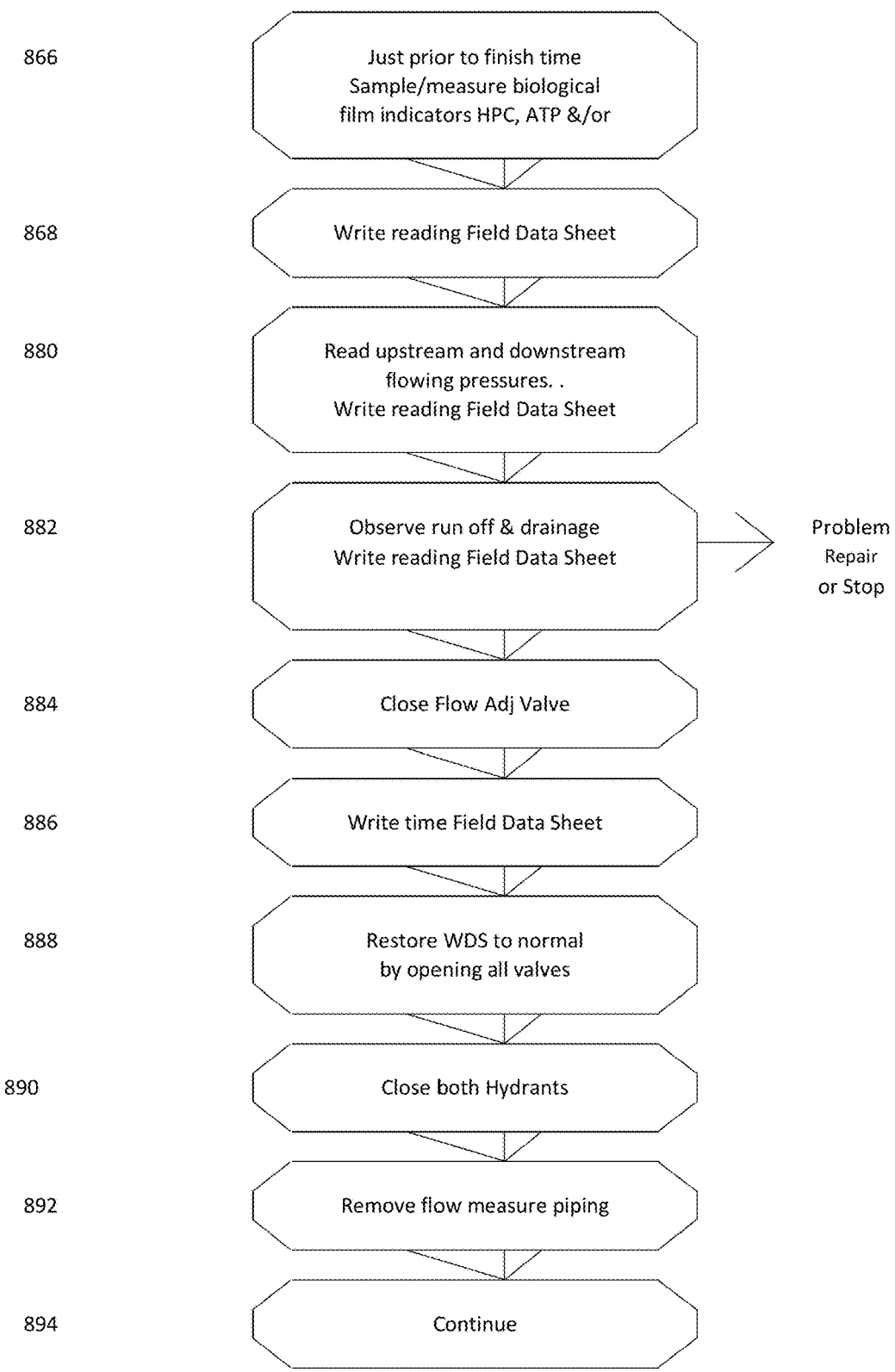

As shown in FIG. 7 the system can implement a preparation protocol that can first locate and confirm involved utility tools and re-mark as needed bright reflective paint or tape 605. Additionally, the protocol can have a self-testing component to monitor devices, such as one or more sensors, to ensure they are powered appropriately. The system can then change, recharge or replenish batteries in devices to insure power during MCR flushing can be properly carried out 610. The system can then locate and assign staging of various components to carry out the MCR flushing protocol, such as a metal detector, valve box cleaning spoon, box cap pry, valve wrench, shovel pick, pavement buster and other items to find and identify, such as access valve boxes, valve operating nuts, and Hydrants 615. The system can then identify and located various gages, sensors, and assemblies, including about 0 to about two each 0.0 to 100.0 psig electronic pressure gages (optional transmitters, downloading and/or logging to central computer: three each 2½ inch to pipe thread Hydrant cap assemblies for mounting gages if gages not zero it can be identified and replaced 620. The system can then locate and identify staging for equipment such as hydrant wrenches open or closed top, hose nozzle mounting flanges to pipe thread for mounting flow measurement piping 625. Next, the system can locate and identify staging needed for either 3 or 2½ inch flow measurement piping, armored masonry level (flow measurement piping discharge must be straight and level), teflon tread tape. The system can use one or more sensors or instruments to monitor if the piping is level and provide user feedback to correct or maintain the level of the piping. The system can then locate and identify staging for one or more pieces of equipment, such as pipe wrenches, that can include 2-foot, 10 foot, and 12-inch adjustable pipe wrenches 635. Additionally, the protocol can identify the necessary safety vests, hazard blinkers, eye protection, waterproof boots 640. If these items are not identified, then the system can stop or cancel the protocol. Lastly, the system can review, confirm and distribute internal notification and agreement details to a user using any suitable display, messaging system, or feedback system 645. The system can the confirm details and publish general public notifications 650 if not discuss or stop the protocol. The system can then confirm external publishing public notifications 660 and identify and assign the positions for the flow measurement piping Water discharge impact during MCR flushing 665. If the confirmation is not provided it can reassess, provide user feedback, or stop the protocol.

As shown in FIG. 8 the system can initiate another protocol to identify a Water Distribution System portion initial Upstream Hydrant 702. The system can then confirm the water supply to Hydrant is fully open 704. Next, all valves except one into portion can be closed 706. The MCR flushing can be supplied only thru this open valve. If there is a problem repair or stop the protocol. The system can then initiate or signal the opening of the Hydrant fill the Hydrant barrel and blow out any debris if the Hydrant valve leaks repair or stop the protocol 708. The hydrant valve can then be closed and tested for proper sealing by use of nominal suction, if leak exists it can notify for repair or stop the protocol 710. The system can use one or more sensors can measure and/or sample for free residual chlorine and/or total coliforms write the reading in the field data sheet 712. The system can then identify and assign the installation of the flow measurement piping on about a 5-inch streamer nozzle with flow adjustment closed 714. The system can then identify and assign nozzle caps with bleeder valves on the hose taps to be installed 716. Next, the system can initialize a valve to open for a pre-determined period of time, such as about 15 seconds to allow for the filling of the hydrant barrel and bleeding out the air 718. Pressure gages can be identified and assigned to the designated hydrant to bleed out the air and monitor the pressure 720. The system can then slowly close the bleeder valves and monitor and record that both gages read the same pressure as the field data sheet 722. If the readings are not the same the system can calibrate or provide user feedback to replace the faulty gage 722.

Next, the initial portion downstream hydrant can be identified and designated by the system 724. They system can then use one or more sensors to determine if the water supply to the hydrant is fully open 726. The downstream portion from the hydrant can then be opened to fill the barrel and blow out any debris 728, if there is any debris or the valve has a leak, the system can stop the protocol and/or signal via user feedback to fix/repair. The downstream hydrant can then be closed, and a sensor/gage can be used to determine if the hydrant closes with nominal suction 730. Flow measurement piping can then be used and can used 732. In some exemplary embodiments, the flow measurement piping can be installed a streamer nozzle with the flow adjustment valve closed. Next, one of the pressure gages can be closed off 734. One or more of the pressure gages can then be closed off and a hose nozzle can then be installed downstream 736. The downstream hydrant valve can then be opened 738 and the bleeder can be slowly closed on the pressure gage 740.

The system can the obtain data from the upstream and downstream static pressures and generate readings on the field data sheet. In some embodiments, the system can employ the door hangers on doors within the portion write those skipped on filed data sheets 744. Next the downstream flow adjustment valve can be opened causing discharge onto the marked spot 23 on the ground. The MCR flushing start time can then be recorded 748 and the system can implement the MCR flushing protocol for the desired or pre-determined duration 750. The finish time can then be calculated 752. The Upstream and Downstream flowing pressures can be recorded and saved to the memory 754 and the runoff and drains can be monitored 756 and recorded to the field data sheets. If an issue or repair is determined to be necessary, the protocol can be stopped. Any biological film indicators, such as heterotropic plate count or adenosine triphosphate can be monitored and measured and the subsequent data can be saved and generated in the field data sheet(s) 758. Additionally, the water from the MCR flushing can be measured using one or more sensors for various factors, such as color, particle, opacity, among other attributes can be collected and results generated in the field data sheet(s) 760. The system can optionally repeat the protocol for hydrants between up & downstream flush supply lines 761. For dead ends between up & downstream, the supply lines can be flushed 762 and can be repeated as existing If existing optional. In this portion the protocol can be repeated as needed the water quality from the MCR flushing can be monitored and measured for various attributes previously cited above 763. Field data sheet(s) can then be generated 764. At pre-determined time proximate to the finish time of the protocol the water can be measured for biological film indicators (Heterotropic Plate Count, Adenosine Triphosphate) 766 and recorded and results generated on a field data sheet 768. The upstream and downstream flow pressures can be measured and recorded, and the runoff and drains can be monitored for any potential hazards 772. If a hazard is detected, the system can alert a user. The flow adjustment valves can then be closed 774 and recorded on the field data sheets 776. The MCR flushing direction can then be reversed by opening a portion valve 778. Once it has been sufficiently flushed the portion valve can be closed 780.

Furthermore, as shown in FIG. 9, the system can while setup immediately reverse MCR flushing direction by opening portion valve 801. The current flushing water supply valve can then be closed 802. A water distribution system portion can be identified and selected that is initial upstream hydrant same as previous downstream 803. The system can then confirm the water supply to hydrant is fully open 804. All valves can be closed except one in the designated portion 806 and MCR flushing can be supplied only thru this open valve. If problem repair or stop the protocol. Next, the hydrant fill can be opened, and the hydrant barrel can blow out any debris 808, if Hydrant valve leaks the protocol can be stopped and a user can be alerted to repair. Next the hydrant can be closed and confirmed by measuring and applying a nominal suction 810, if the hydrant valve leaks a user can be alerted to repair and/or the protocol can be stopped. The water sample can then be measured for any residual chlorine and/or total coliforms and recorded and generated in the field data sheets 812. A flow measurement piping can be installed and, in some embodiment, installed onto a streamer nozzle and the system can maintain the valve in a closed position 814. One or more nozzle caps with bleeder valves can be used each of the hose taps 816. The hydrant fill can then be opened and allow the air to bleed out of the hydrant barrel 818. Two pressure gages can be located proximate to the nozzles 820 to slowly blead out the air. Th bleeders can be slowly closed, and the measurements of both pressure gages can be compared to ensure the same pressure measurement 822. If the measurements are different the system can alert a user to that the gages need to be calibrated or replaced.

The system or user can then designate an initial Water Distribution System (WDS) portion downstream hydrant same as previous upstream 824 and the water supply to hydrant can the be measured to confirm that it is fully opened 826. The downstream hydrant fill can then be opened, and the hydrant barrel can blow out any debris 828. Next the downstream hydrant can then be closed and monitored for proper closure by applying a nominal suction 830. A flow measurement piping with a streamer nozzle can be used and the flow adjustment valve is closed 832. One of the pressure gages can be closed off 834. A pressure gage can be located on the hydrant nozzle downstream 836 and the downstream hydrant valve can the be opened 838. The bleeder valves on the pressure gage can then be slowly closed 840. Upstream and downstream static pressures can then be recorded, saved, and generated in the field data sheet(s) 842. Door Hangers can be employed on doors within portion. The downstream flow adjustment valve causing discharge unto the marked spot can then be opened 846 and the MCR flushing start time can be recorded 848. The system can generate a desired flushing time, or a user can input a desired flushing time needed for the protocol 852. The upstream and downstream flowing pressures can be recorded using one ore more sensors 854, while also monitoring run off & drains 856 during the flushing protocol. Similar, to above any biological film indicators, such as heterotropic plate count or adenosine triphosphate can be monitored and measured and the subsequent data can be saved and generated in the field data sheet(s) 858. Additionally, the water from the MCR flushing can be measured using one or more sensors for various factors, such as color, particle, opacity, among other attributes can be collected and results generated in the field data sheet(s) 860. The system can optionally repeat the protocol for hydrants between up & downstream flush supply lines 862. At pre-determined time proximate to the finish time of the protocol the water can be measured for biological film indicators (Heterotropic Plate Count, Adenosine Triphosphate) 866 and recorded and results generated on a field data sheet 868. The upstream and downstream flow pressures can be measured and recorded 880 and the runoff and drains can be monitored for any potential hazards 882. If a hazard is detected, the system can alert a user. The flow adjustment valves can then be closed 884 and recorded on the field data sheets 886. The WDS can then be restored to normal by opening all valves 888 and both hydrant valves can be closed 890. Any flow measure piping can then be removed 892.

Figure 10:
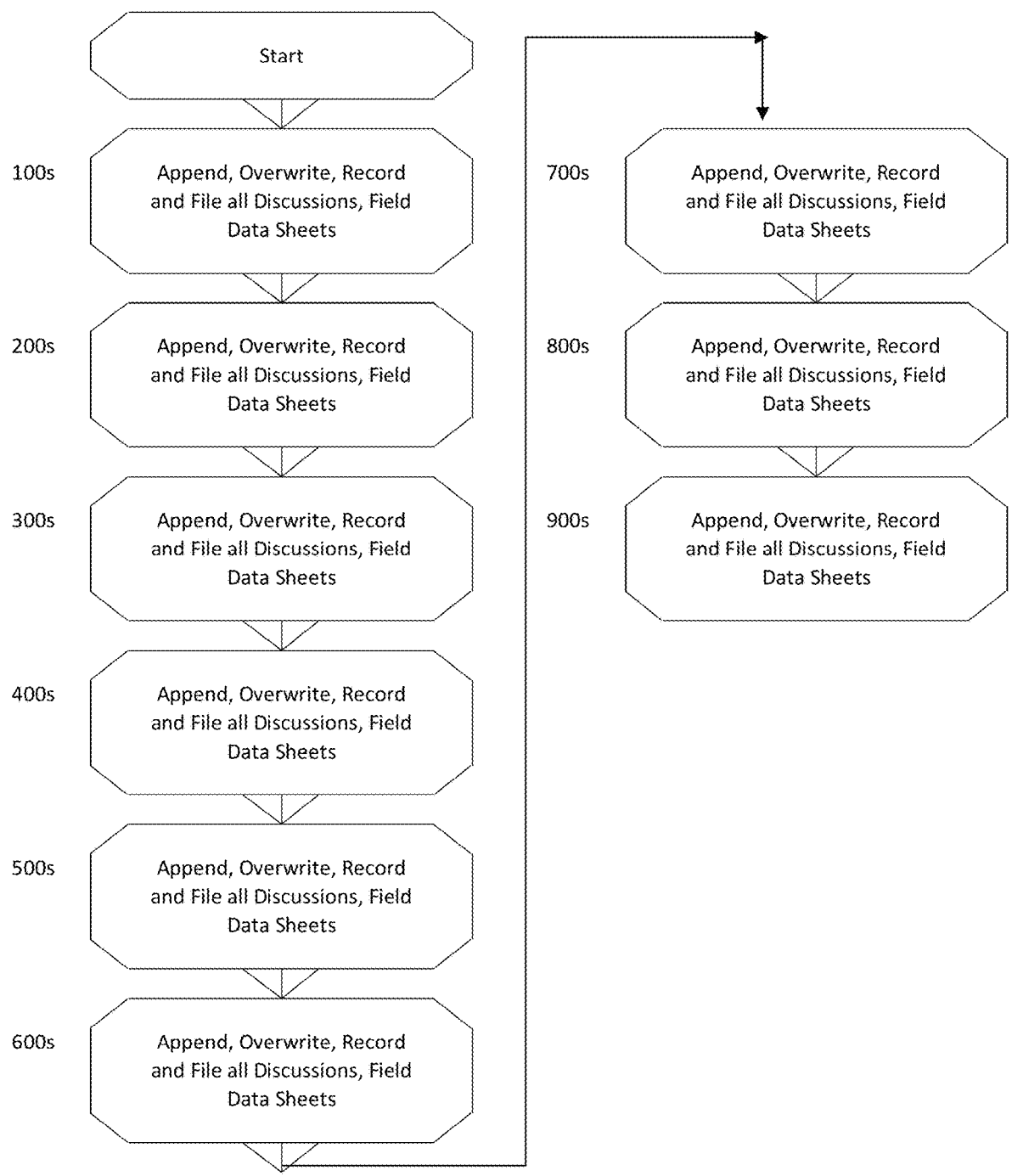
FIG. 10 is a flow chart of an exemplary implementation of a method within the technology.
Figure 11:
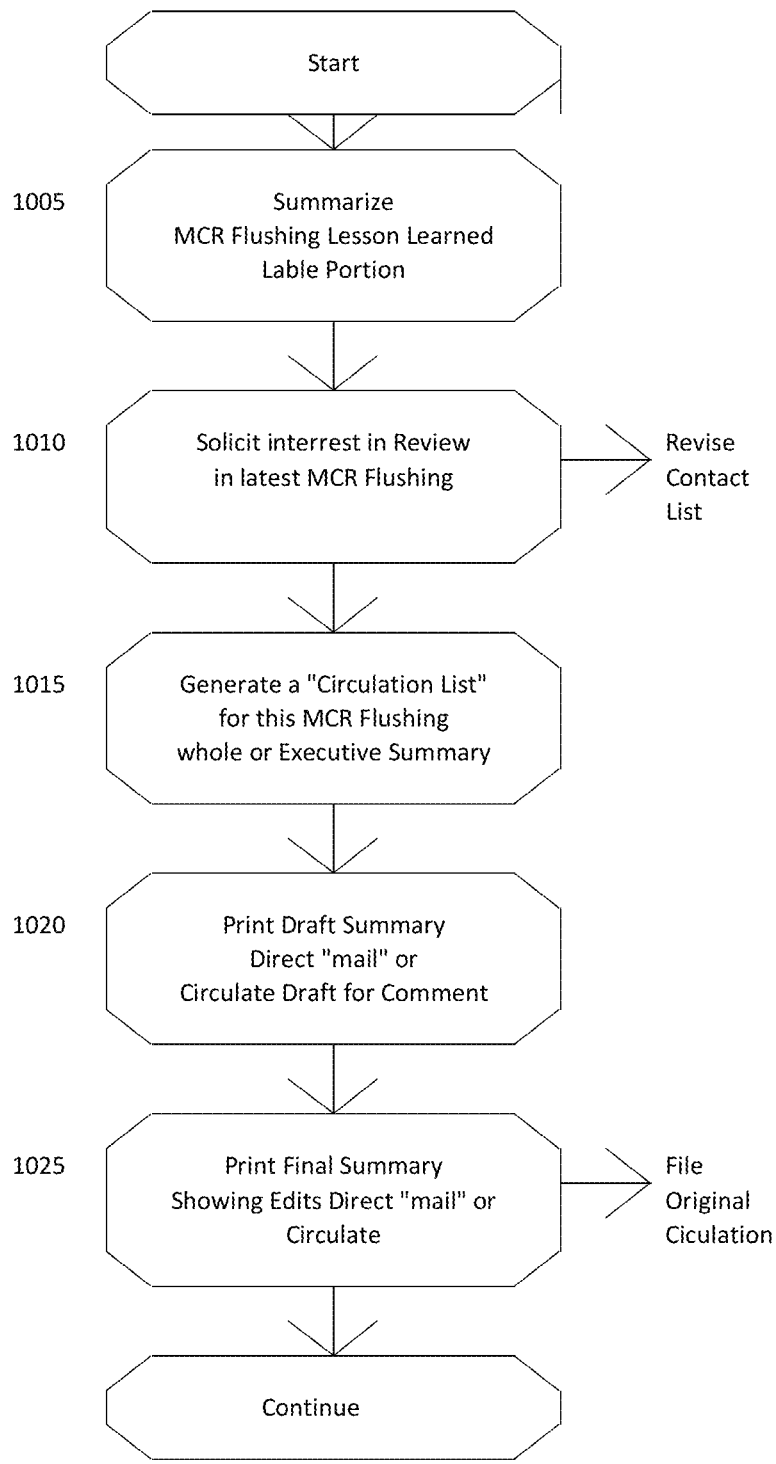
FIG. 11 is a flow chart of an exemplary implementation of a method within the technology.
Figure 32:
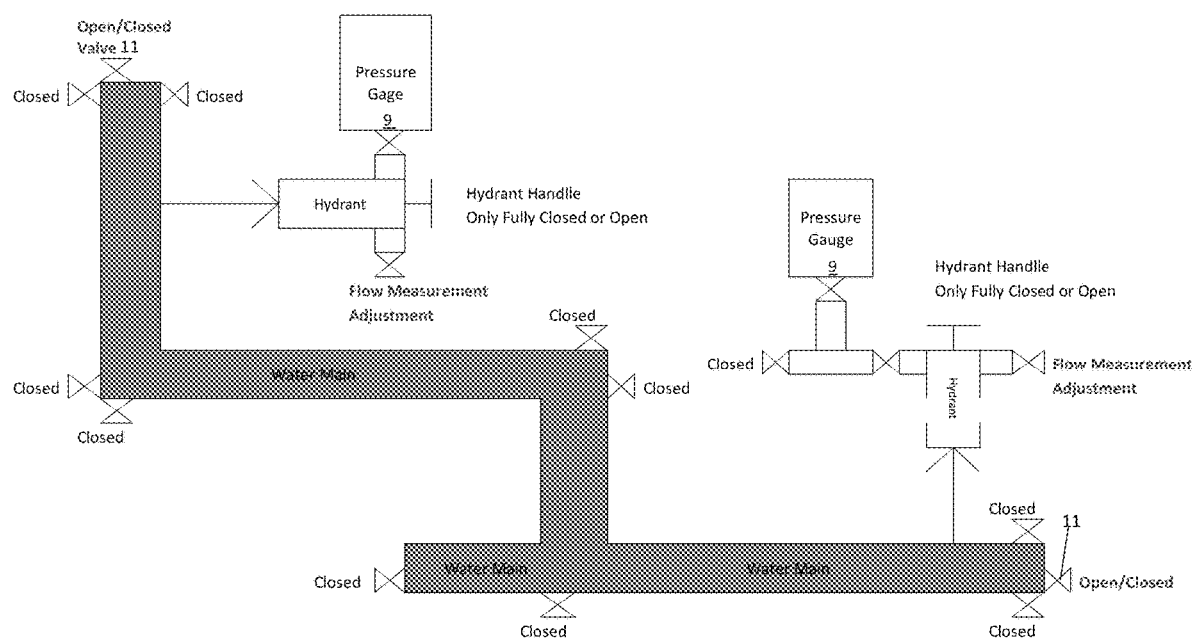

As shown in FIG. 10, the various protocols can also include an appending, overwriting, recording, and store of all discussion, comments, and field data sheets. The data can be stored on the memory and used for future reference in future iterations and applications of the protocol. Additionally, as shown FIG. 11, the system can generate field data sheets to summarize the MCR flushing procedure 1005. Lesson Learned Label Portion 1010 can be transmitted and used to solicit interest in Review in latest Measured, Controlled and Recorded Flushing if useful revise contact list 1015. A circulation list can be generated for the MCR flushing whole or executive summary 1020 and then printed and/or sending a draft summary via mail or electronic mail to be circulated for comment. The Final Summary Showing Edits Direct "mail" or Circulate File original circulation can then be generated and transmitted by the system.

FIG. 12 illustrates an exemplary embodiment of a system of the present disclosure for measuring various pressures at various point of a water distribution system and maintenance protocols that can be used to determine that the distribution system is currently working at optimum distribution.

Figure 13:
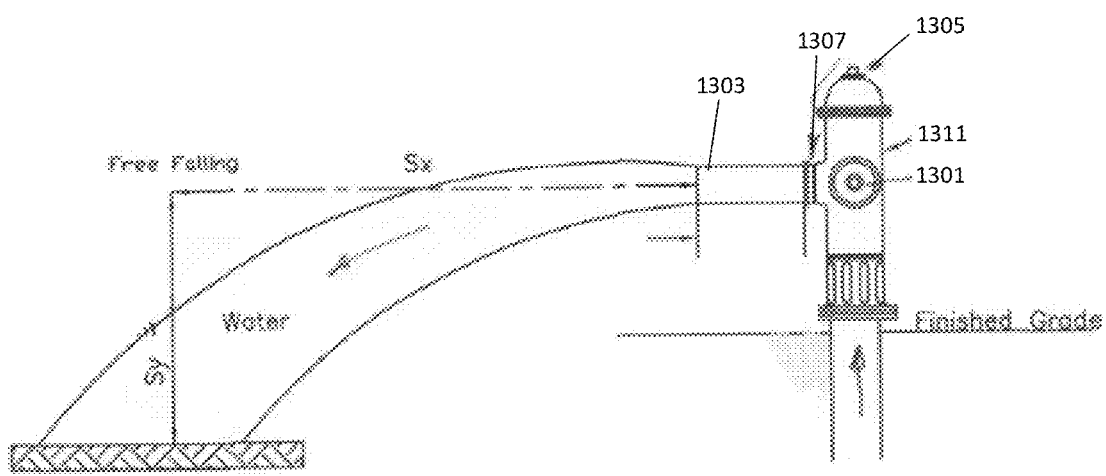
FIG. 13 is a schematic of an exemplary process implemented by the system.

As shown in FIG. 13, one flow measurement method can include measuring the distance travelled by water as it exits a water main/hydrant 1321. A pressure gage 1301 can be located proximate to the exit valve of the water main. A hose, pipe, or other suitable directional guiding apparatus 1303 can be coupled to the exit valve of the water main hydrant. In one exemplary embodiment, the directional guiding apparatus can be at least about 10 to about 30 inches, from about 15 to about 20 inches, or about 18 inches in length. The directional guiding apparatus can have one or more flow adjustment valves 1305, as well as one or more flow straightening vanes 1307. A user or the system using one or more sensors, such as a distance sensor, can obtain varying measurements such as the distance travelled by the leading edge of the water flow (Sx), the drop of the water from the center of the directional guiding apparatus (Sy). The system can that use these values and put them into a formula $Q=2.83*d^2*Sx/\sqrt{Sy}$, where Q is the discharge in gallons of water per minute and d is equal to the inside diameter of the directional guiding apparatus or discharge pipe 1303. The distance between hydrants in some exemplary embodiments can be from 10 to 10000 feet or about 500 to about 5000 feet, or about 1000 to 3000 feet.

Figure 14:
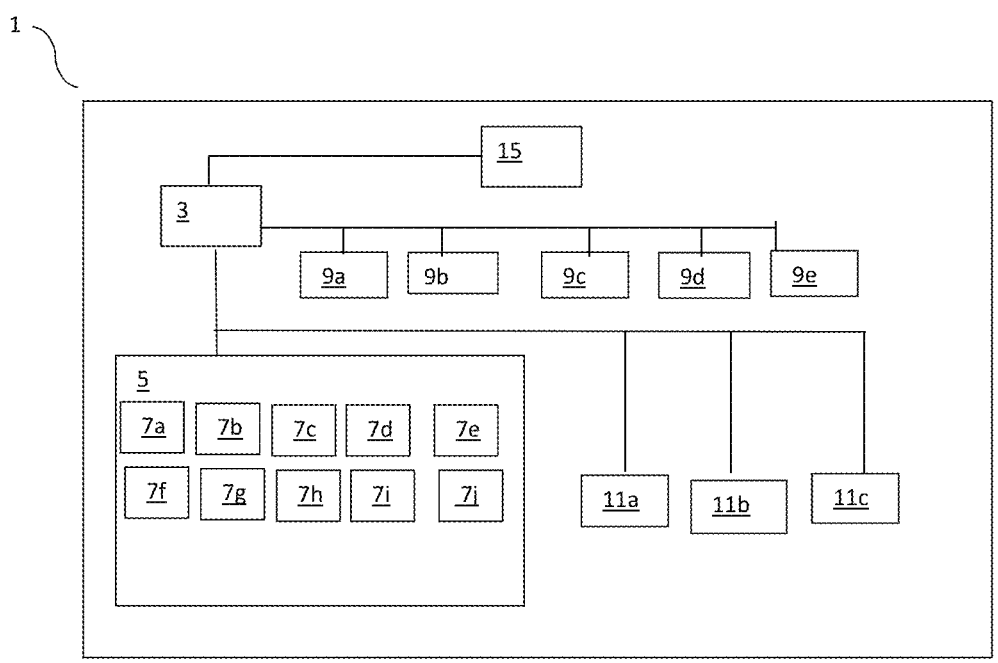
FIG. 14 is a diagram of an exemplary embodiment of the system of the present disclosure.

Furthermore, as shown in FIG. 14, the system 1 can include any suitable means such as a computer and can include a processing means 3, memory 5 for storing predetermined programs or protocols 7(*a-j*), and communicatively coupled to the various apparatuses such as valves 9 and/or sensors 11. The valves can be couple to various component and at various locations water distribution system and moveable between an open and closed position. Similarly, the sensors can include flowmeters, pressure gages, distance sensors, ultra-sonic sensors, and other sensors the apparatus may incorporate in order to optimize the function of the system. The system can also be communicatively coupled to a feedback means 15, such as a display, messaging system, or other alerting device.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present invention and fall within the spirit and scope of the present disclosure.

Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A method of measuring, controlling, and recording flushing of a water distribution system (WDS) comprising:
   measuring selected flow rate ranges of water into and out of the WDS between a first hydrant and a second hydrant;
   controlling the selected flow rate ranges of water into and out of the WDS between the first hydrant and the second hydrant; and
   recording the selected flow rate ranges of water into and out of the WDS between the first hydrant and the second hydrant;
   measuring the flow rate and volume of water into and out of the WDS piping to determine pressure drop, obstructions, tuberculation and occlusions before and after flushing the WDS between the first hydrant and the second hydrant; and
   reversing the water flow of the WDS and measuring the flow rate and volume of water in and out of the WDS piping to further determine the pressure drop, obstructions, tuberculation and occlusions before and after flushing, wherein the distance between the first hydrant and the second hydrant is between 10 feet and 10,000 feet.

2. The method of claim 1, wherein the distance between the first hydrant and the second hydrant is between 500 and 3000 feet.

3. The method of claim 2, wherein the flow rate is determined using the distance traveled by the water out of the WDS and the vertical drop from the exit of the WDS to the ground.

4. The method of claim 3, wherein one or more sensor can measure the flow rate ranges between the first hydrant and the second hydrant.

5. The method of claim 4, wherein one or more valves can control the flow rate of water in and out of the WDS.

6. The method of claim 5, wherein the one or more sensor can be communicatively coupled to a control system including a processor and a memory, wherein the memory can store one or more measurements from the one or more sensors.

7. The method of claim 6, wherein the one or more valves are communicatively coupled to the control system.

8. The method of claim 7, wherein the control system can open or close one or more of the valves.

9. The method of claim 8, wherein the flow rate and volume measurements are stored onto the memory of the control system.

10. The method of claim 9, wherein the sensors comprise one or more pressure gages, one or more flow sensors, one or more level sensors, or one or more distance sensors.

11. The method of claim 10, wherein the control system further includes a feedback system configured to communicate with a user the measurement data.

12. The method of claim 11, wherein one or more sensors can measure the flow rate and volume of water into and out of the WDS piping.

13. The method of claim 11, wherein a portion valve can be activated to reverse the water flow direction.

14. The method of claim 11, wherein a scouring data rate can be calculated from at least one of the following:
   flow rate, volume of water, and water velocity.

15. The method of claim 14, further comprising measuring the distance travelled by the leading edge of the water flow (Sx) and drop of the water (Sy) from the center of a directional guiding apparatus coupled to at least one of the first hydrant or second hydrant.

16. The method of claim 15, further comprising determining the discharge of water from the WDS in gallons per minute utilizing the Sx and Sy values and the formula, $Q = 2.83 * d^2 * Sx/\sqrt{Sy}$, where Q is the discharge in gallons of water per minute and d is equal to the inside diameter of the directional guiding apparatus or discharge pipe.

* * * * *